United States Patent
Yan et al.

(10) Patent No.: US 6,952,353 B2
(45) Date of Patent: Oct. 4, 2005

(54) INTEGRATED MAGNETIC ISOLATED TWO-INDUCTOR BOOST CONVERTER

(75) Inventors: Liang Yan, Malden, MA (US); Bradley M. Lehman, Belmont, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 10/771,626

(22) Filed: Feb. 4, 2004

(65) Prior Publication Data

US 2004/0218404 A1 Nov. 4, 2004

Related U.S. Application Data

(60) Provisional application No. 60/444,821, filed on Feb. 4, 2003.

(51) Int. Cl.[7] .............................................. H02M 3/335
(52) U.S. Cl. ......................................... 363/16; 363/131
(58) Field of Search ............................ 363/16, 24, 131, 363/49

(56) References Cited

U.S. PATENT DOCUMENTS

| | | | |
|---|---|---|---|
| 3,553,620 A | 1/1971 | Cielo et al. | |
| 4,853,668 A | 8/1989 | Bloom | 336/214 |
| 4,864,478 A | 9/1989 | Bloom | 363/16 |
| 5,436,818 A | 7/1995 | Barthold | 363/21 |
| 5,555,494 A | * 9/1996 | Morris | 363/17 |
| 5,784,266 A | 7/1998 | Chen | 363/16 |
| 6,239,584 B1 | 5/2001 | Jang et al. | 323/222 |
| 6,362,986 B1 | 3/2002 | Schultz et al. | 363/132 |
| 6,388,896 B1 | 5/2002 | Cuk | 363/16 |
| 6,549,436 B1 | 4/2003 | Sun | 363/44 |

OTHER PUBLICATIONS

Miwa et al., "High Efficiency Power Factor Correction Using Interleaving Techniques," IEEE, pp. 557–568, 1992.
Wolfs, "A Current–Sourced Dc–DC Comverter Derived via the Duality Principle from the Half–Bridge Converter," IEEE Transactions on Industrial Electronics, vol. 40. , No. 1, pp. 139–144, Feb. 1993.
Zhu et al., "New Start–up Schemes for Isolated Full–Bridge Boost Converters," IEEE Transactions on Power Electronics, vol. 18, No. 4, pp. 946–951, Jul. 2003.

* cited by examiner

*Primary Examiner*—Shawn Riley
(74) *Attorney, Agent, or Firm*—Weingarten, Schurgin, Gagnebin & Lebovici LLP

(57) ABSTRACT

A two-inductor boost converter includes an integrated magnetic core having a three-legged flux-conducting element with an energy-storing gap, for example in the center leg. Two primary windings are disposed on respective legs, such as the outer legs, and are coupled in parallel to one input terminal of the converter. Two series-connected secondary windings are also disposed on the flux-conducting element, and are connected to rectification and filtering circuitry which may have full bridge, full wave, or voltage doubler configuration. Primary-side switches are coupled in series between each primary winding and the other converter input terminal. Control circuitry generates control signals for the primary-side switches, providing for a desired degree of overlapped conduction during each operating cycle along with periods of non-conduction that result in transferring electrical energy to the load. The integrated magnetic core can include additional windings for ancillary functions, such as for flyback operation during start-up.

15 Claims, 18 Drawing Sheets

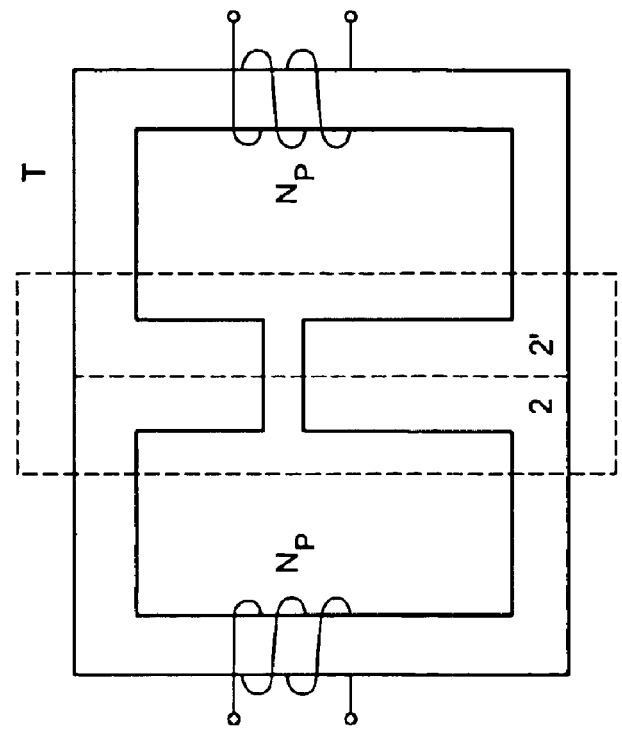
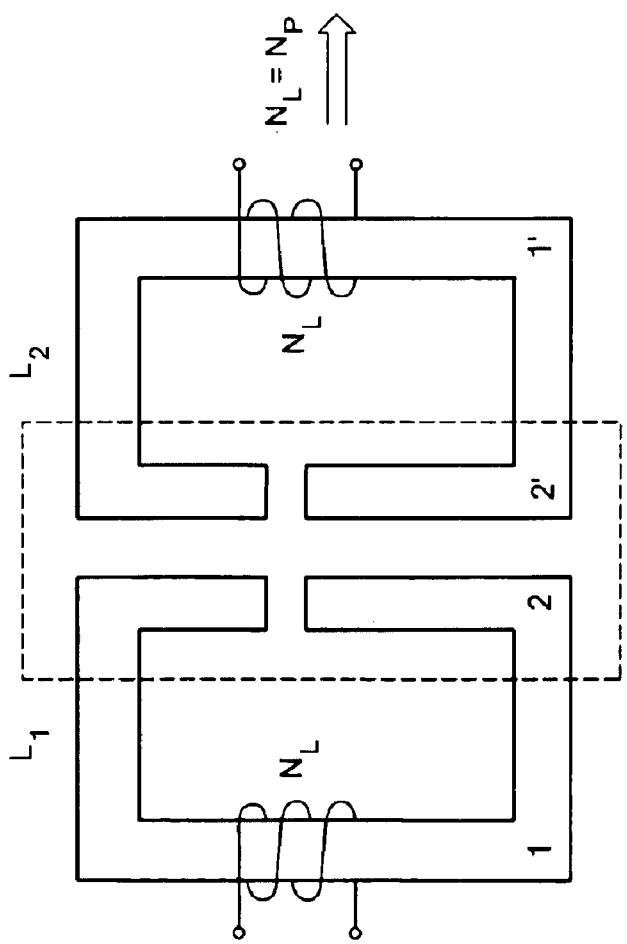
FIG. 8b
FIG. 8a
PRIOR ART

Flux flow
→

US 6,952,353 B2

INTEGRATED MAGNETIC ISOLATED TWO-INDUCTOR BOOST CONVERTER

CROSS REFERENCE TO RELATED APPLICATIONS

This application claims priority under 35 U.S.C. §119(e) of U.S. Provisional Patent Application No. 60/444,821 filed Feb. 4, 2003, the disclosure of which is hereby incorporated by reference herein.

STATEMENT REGARDING FEDERALLY SPONSORED RESEARCH OR DEVELOPMENT

Not Applicable

BACKGROUND OF THE INVENTION

The present invention is related to the field of DC—DC power converters.

Among the myriad types of circuit topologies employed in DC—DC power converters is a converter known as the "two-inductor boost converter". This converter has a boost, or voltage-step-up, transfer function, and employs two parallel inductors with partially overlapped conduction. The two-inductor boost converter exhibits benefits particularly in high power applications due to the splitting of high input current between two inductors and the resulting reduction in $I^2R$ power loss in both copper windings and primary-side switches. An interleaving control strategy can be used to reduce input current ripple. Implementation of the topology can be in either non-isolated or isolated format. The isolated boost topology is attractive in applications such as isolated power factor correction (PFC) and in battery- or fuel-cell-powered devices to generate high output voltage from low input voltage.

One problem with the basic two-inductor boost converter topology is its limited power regulation range. Due to the nature of the control required for boost operation, the magnetizing currents of the two inductors cannot be limited, and thus a minimum output power level is required. If the load demands less power than this minimum level, the output voltage increases abnormally because excessive energy has been stored in the inductors.

U.S. Pat. No. 6,239,584 B1 of Jang et al. shows a solution to this limitation on minimum power. Referring for example to FIG. 2, an auxiliary transformer is inserted in series with the two inductors L1 and L2. The transformer magnetically couples the two input current paths, forcing the currents in the two inductors to be identical. Theoretically, the input current only increases when both of the switches S1 and S2 are on. If the overlapping between the two driving signals is small, the inductor currents become discontinuous. This improvement makes the two-inductor boost circuit attractive in application. However, a disadvantage of the approach is that the circuit requires four magnetic components on the primary side, thus requiring additional circuit board space.

It is generally known in the prior art to utilize so-called "integrated magnetics" circuit techniques to achieve certain efficiencies and/or operating characteristics, including reduced overall circuit size. Multiple windings are employed on a single flux-conducting core to implement multiple functions, in contrast to the traditional use of discrete inductors and transformers that are wired together to realize similar functions. It would be desirable to realize the benefits of integrated magnetics in two-inductor boost converters.

BRIEF SUMMARY OF THE INVENTION

In accordance with the present invention, an isolated two-inductor boost converter employing integrated magnetics is disclosed. The converter achieves the benefits of boost conversion with wide load regulation range, along with the benefits of integrated magnetics, such as reduced circuit size.

The converter includes an integrated magnetic core having a three-legged flux-conducting element with at least one energy-storing leg, which may include for example an air gap or a segment of high-permeance material. In one embodiment, an air gap is disposed in the center leg, whereas an alternative embodiment includes gaps on the outer legs. Two primary windings are disposed on respective legs of the flux-conducting element, the primary windings being coupled in parallel to a first input terminal of the converter. The integrated magnetic core further includes two series-connected secondary windings disposed on the flux-conducting element.

Secondary-side rectification and filtering circuitry is connected across the secondary windings. This can take one of several forms, including full bridge, full wave, and voltage doubler.

The converter further includes a pair of primary-side switches, each coupled in series between a second input terminal of the converter and a respective one of the primary windings. Control circuitry generates control signals for the primary-side switches so as to obtain a desired boost-mode output voltage of the converter. In general, the control signals provide for a desired degree of overlapped conduction of the two switches during each operating cycle, combined with periods of non-conduction of each switch that results in the transfer of electrical energy to the load.

The integrated magnetic core can include additional windings for certain desirable functions, such as to facilitate flyback operation during start-up and thereby avoid undesirable conditions that might arise from operating in boost mode when the magnitude of the output voltage is too low.

Other aspects, features, and advantages of the present invention will be apparent from the Detailed Description that follows.

BRIEF DESCRIPTION OF THE SEVERAL VIEWS OF THE DRAWINGS

The invention will be more fully understood by reference to the following Detailed Description of the invention in conjunction with the Drawing, of which:

FIGS. 8a and 8b are schematic diagrams illustrating differences between the prior use of discrete inductors and the integrated inductors of the converter of FIG. 3;

DETAILED DESCRIPTION OF THE INVENTION

Figure 1:
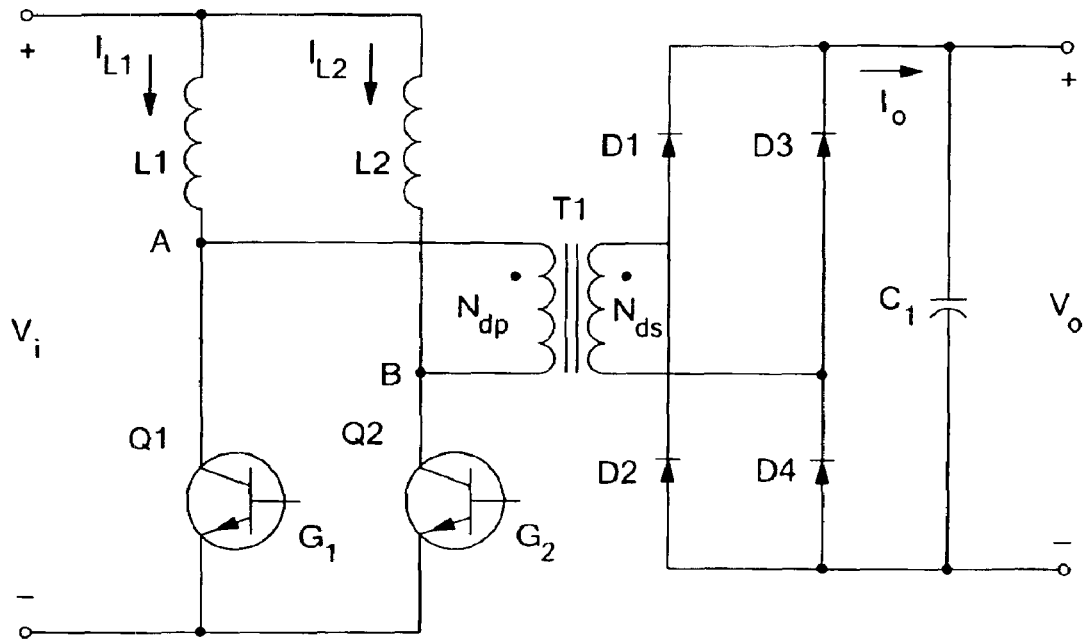
FIG. 1 is a schematic diagram of an isolated two-inductor boost converter as known in the art.

FIG. 1 shows a two-inductor DC—DC converter having an isolated boost topology, which as mentioned above is useful in applications such as power factor correction (PFC) with isolation and in battery- or fuel-cell-powered devices to generate high output voltage from low input voltage. As also mentioned above, one drawback of the circuit in FIG. 1 is its limited power regulation range. Inductor L1 must support the input voltage Vi whenever transistor Q1 turns on, and likewise for inductor L2 and transistor Q2. Because the minimum duty ratio of each transistor Q1 and Q2 is 0.5, the magnetizing currents of the two inductors L1 and L2 cannot be limited. If the load demands less power than a predetermined minimum level, the output voltage Vo increases abnormally because excessive energy has been stored in the inductors L1 and L2.

Figure 2:
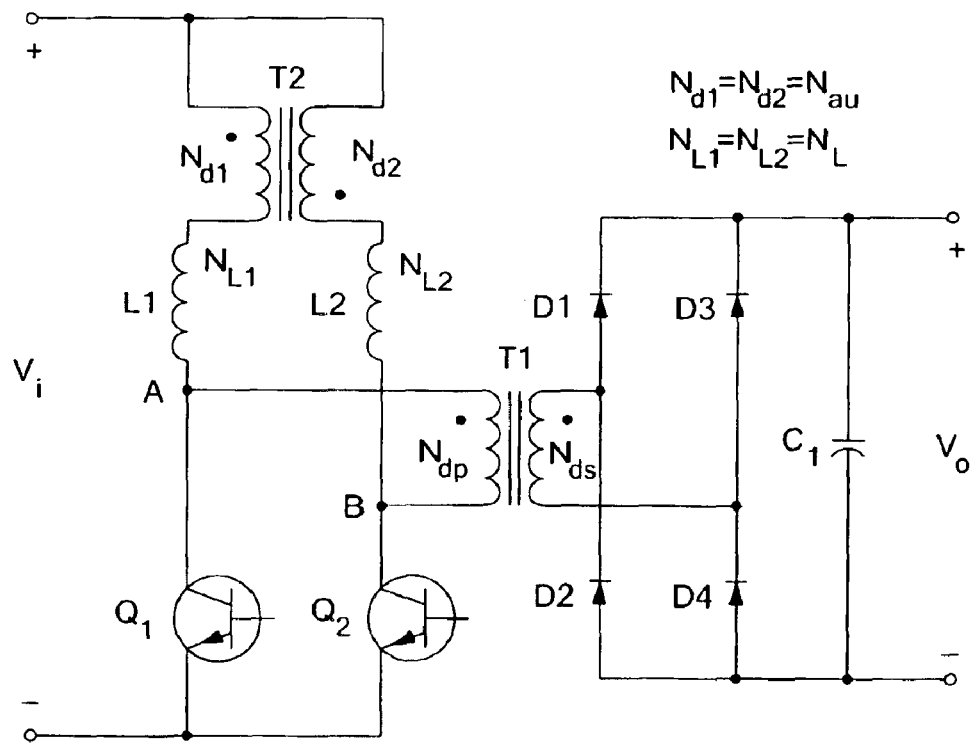
FIG. 2 is a schematic diagram of an improved isolated two-inductor boost converter as known in the art.

FIG. 2 shows an alternative prior art topology intended to overcome this limitation on minimum power. An auxiliary transformer T2 is inserted in series with inductors L1 and L2. Transformer T2 magnetically couples the two input current paths, forcing the currents in the two inductors L1 and L2 to be equal. Theoretically, the input current only increases when both Q1 and Q2 are on. If the overlap between the two driving signals for transistors Q1 and Q2 is small, the inductor currents $I_{L1}$ and $I_{L2}$ become discontinuous. This improvement makes the two-inductor boost circuit attractive in applications. However, a disadvantage of the approach is the requirement for four magnetic components on the primary side (two inductors and two transformers).

Figure 3:
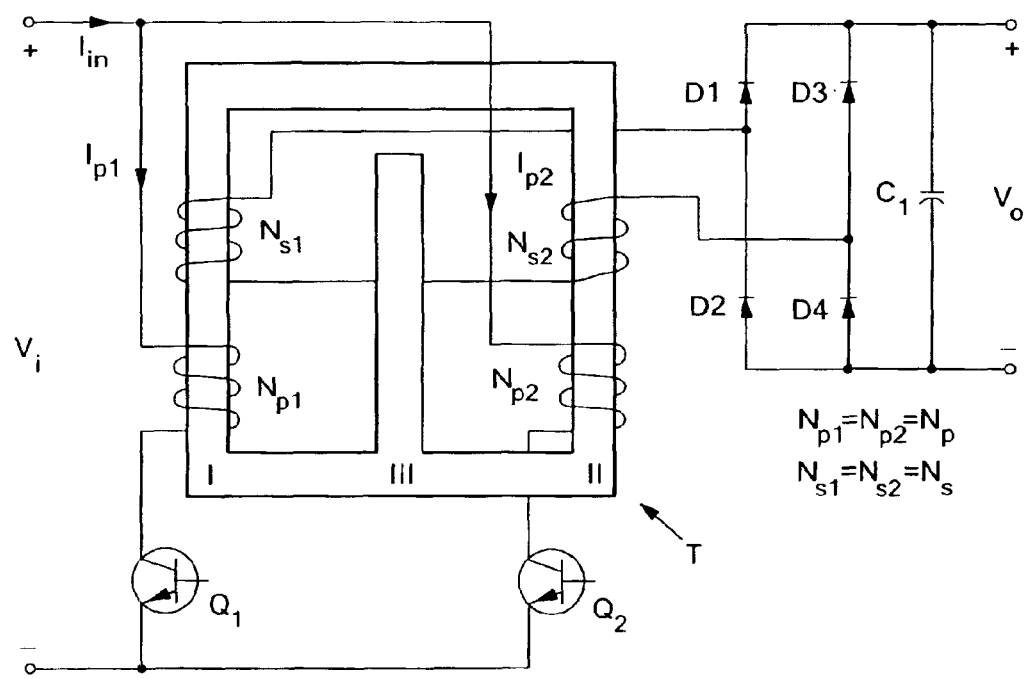
FIG. 3 is a schematic diagram of an isolated two-inductor boost converter employing integrated magnetics in accordance with the present invention.

FIG. 3 shows an integrated magnetic two-inductor boost converter employing a transformer having a single magnetic core with three legs (I, II, and III) with a gap in the center leg III. Two windings $N_{p1}$ and $N_{p2}$ are wound around the two outer legs I and II. Secondary windings $N_{s1}$ and $N_{s2}$ are also wound around the two outer legs I and II and connected in series. Because the windings $N_{p1}$ and $N_{p2}$ are on the primary side and behave as primary windings, they are referred to herein as primary windings.

Figure 4A:
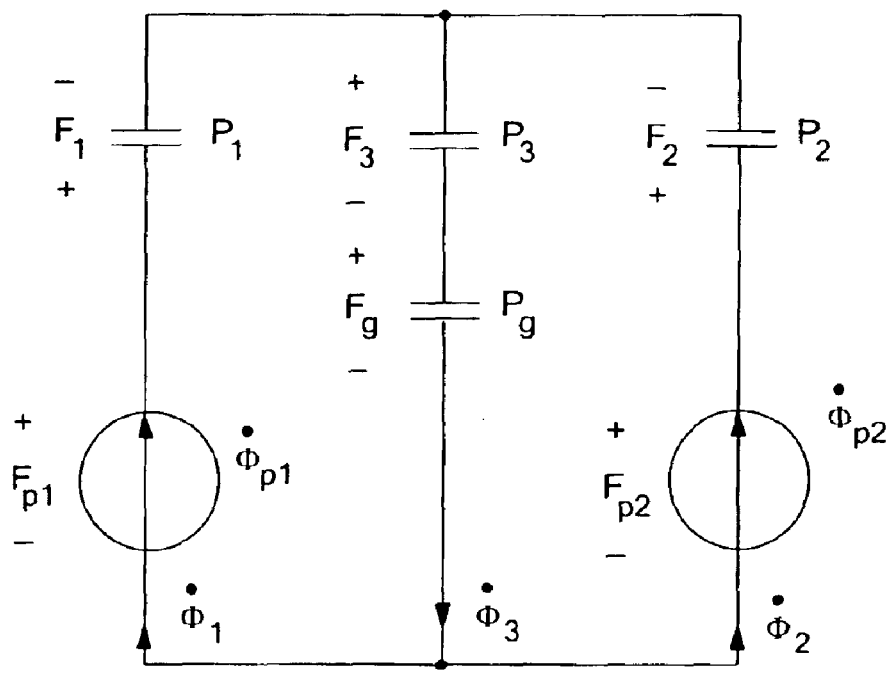
FIGS. 4a and 4b are schematic models used in describing the operation of the converter of FIG. 3.
Figure 4B:
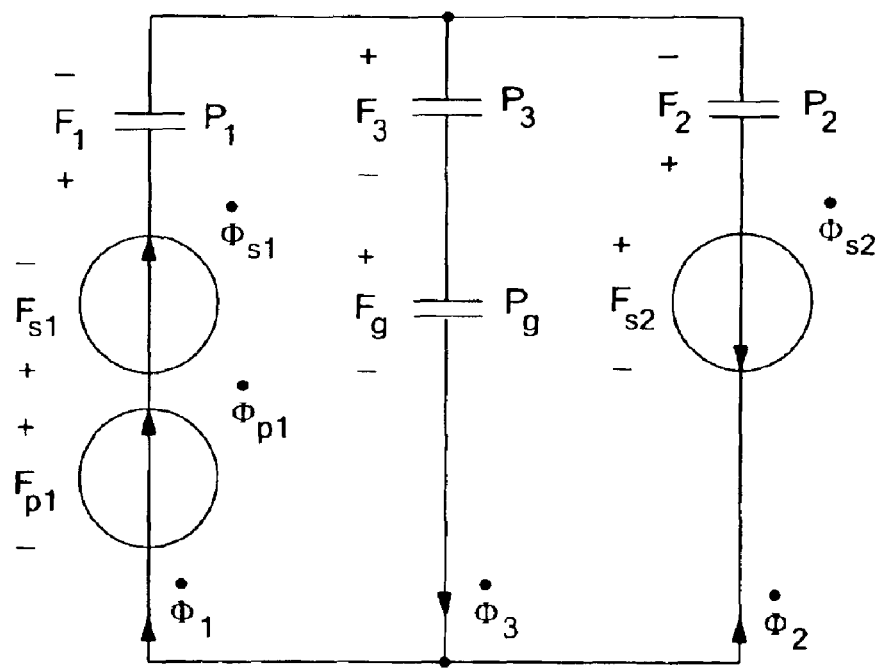

FIGS. 4a and 4b show models of the circuit of FIG. 3 in two circuit states in a half switching cycle. FIG. 4a corresponds to both transistors Q1 and Q2 being ON, whereas FIG. 4b corresponds to transistor Q1 being ON and transistor Q2 being OFF. The circuit states are modeled using a capacitor modeling method, in which each current source represents an active winding and each capacitor represents a permeance. In this method when a winding is inactive, its current source is represented as a short circuit. $\dot{\Phi}_{j(j=1,2,3)}$ represent the respective flux rates within the core legs (i.e. the derivative of flux, which is equal to V/N, where V is the voltage on the winding around the core leg and N is the number of winding turns); $P_{j(j=1,2,3)}$ are the respective permeances of the core legs; $P_g$ is the permeance of the gap; $F_{j(j=1,2,3)}$ are the magnetomotive forces (mmfs) on permeances $P_{j(j=1,2,3)}$; and $F_g$ is the mmf of the gap.

Figure 5:
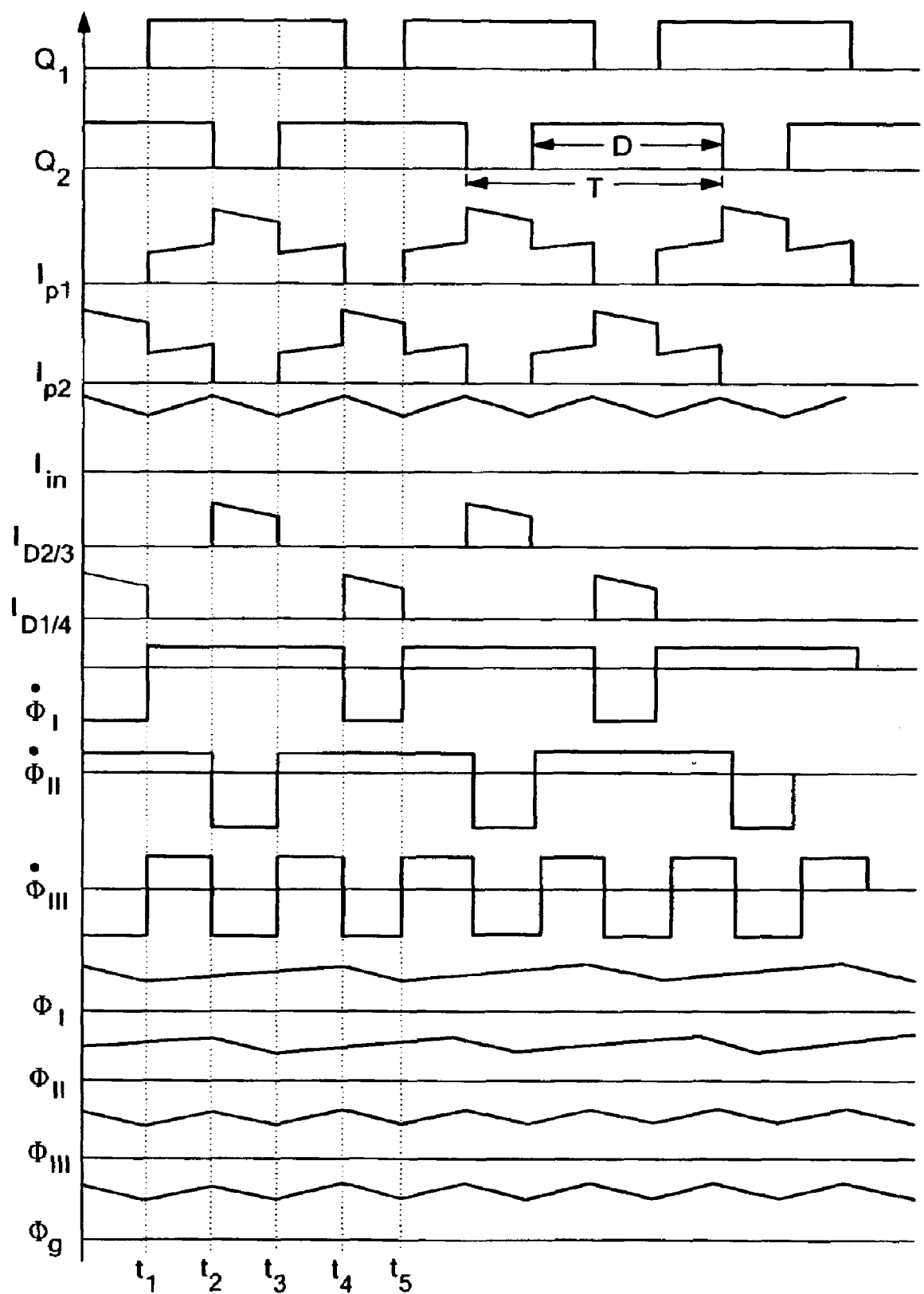
FIG. 5 is a diagram of certain operating waveforms in the converter of FIG. 3.
Figure 6A:
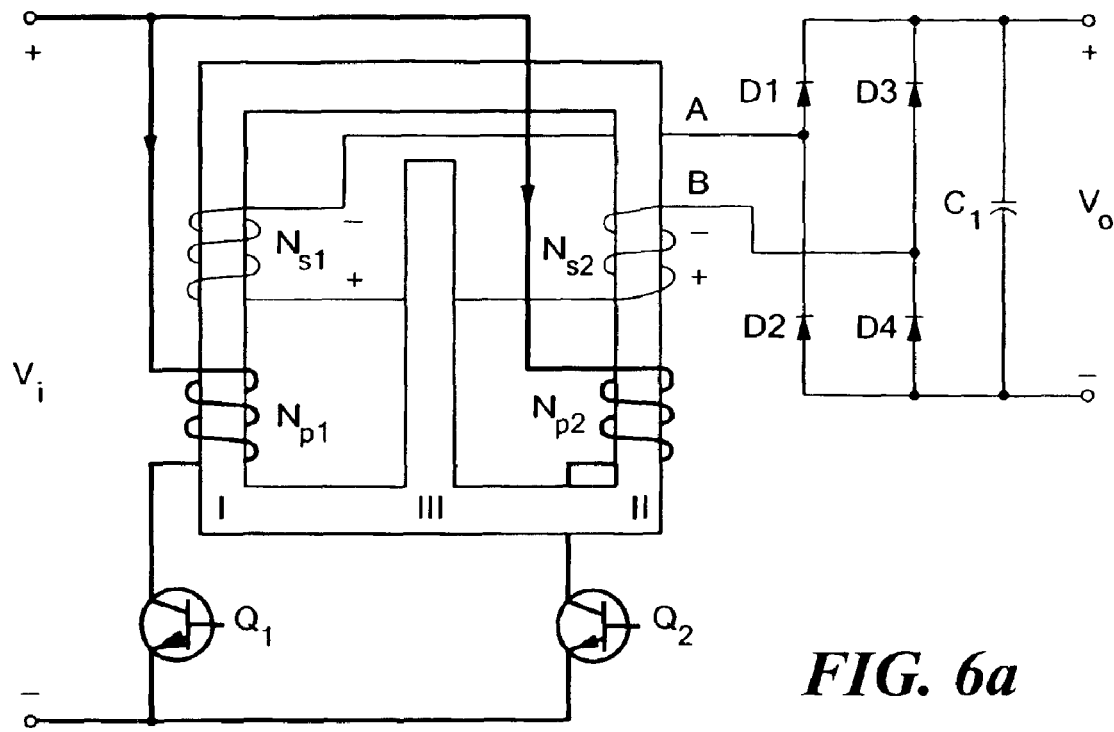
FIGS. 6a–6d are schematic diagrams illustrating different operating phases of the converter of FIG. 3.
Figure 6B:
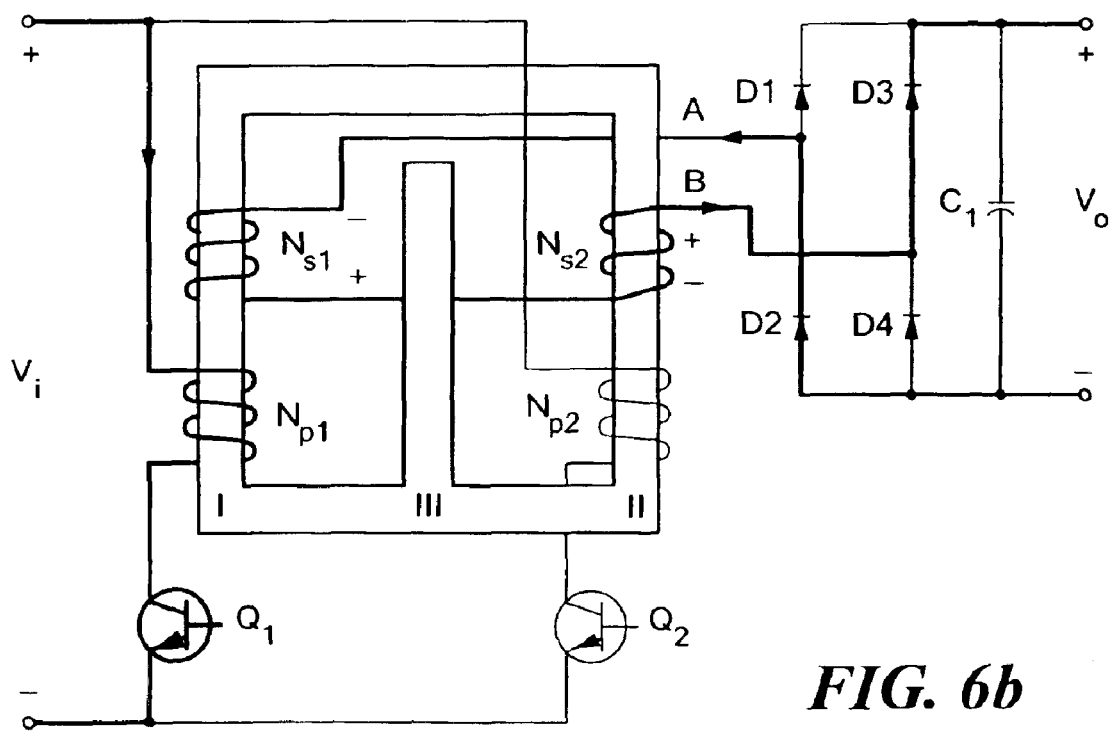
Figure 6C:
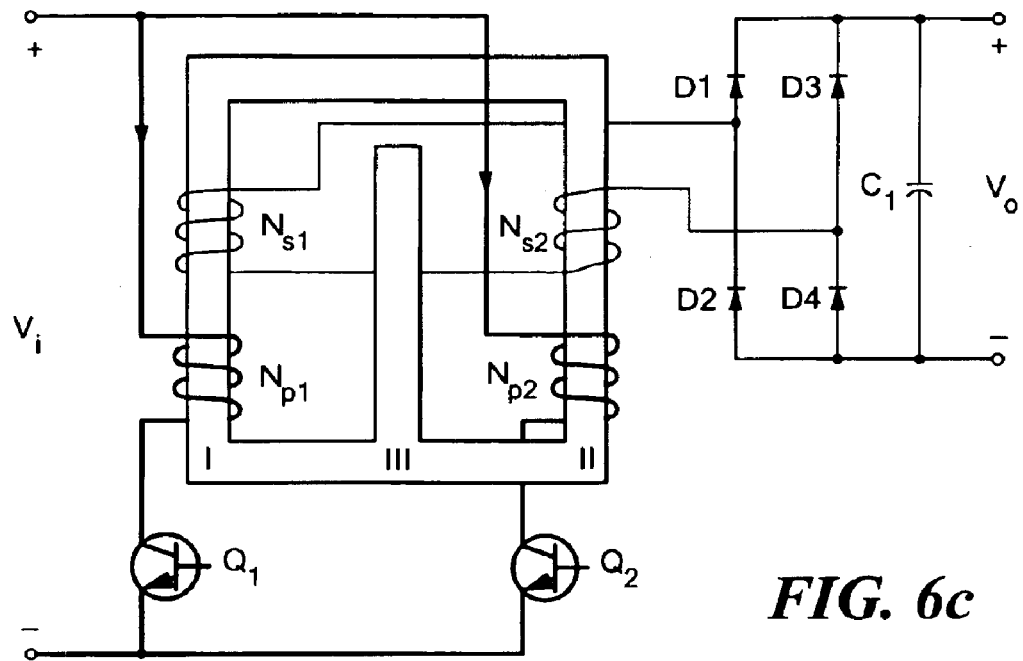
Figure 6D:
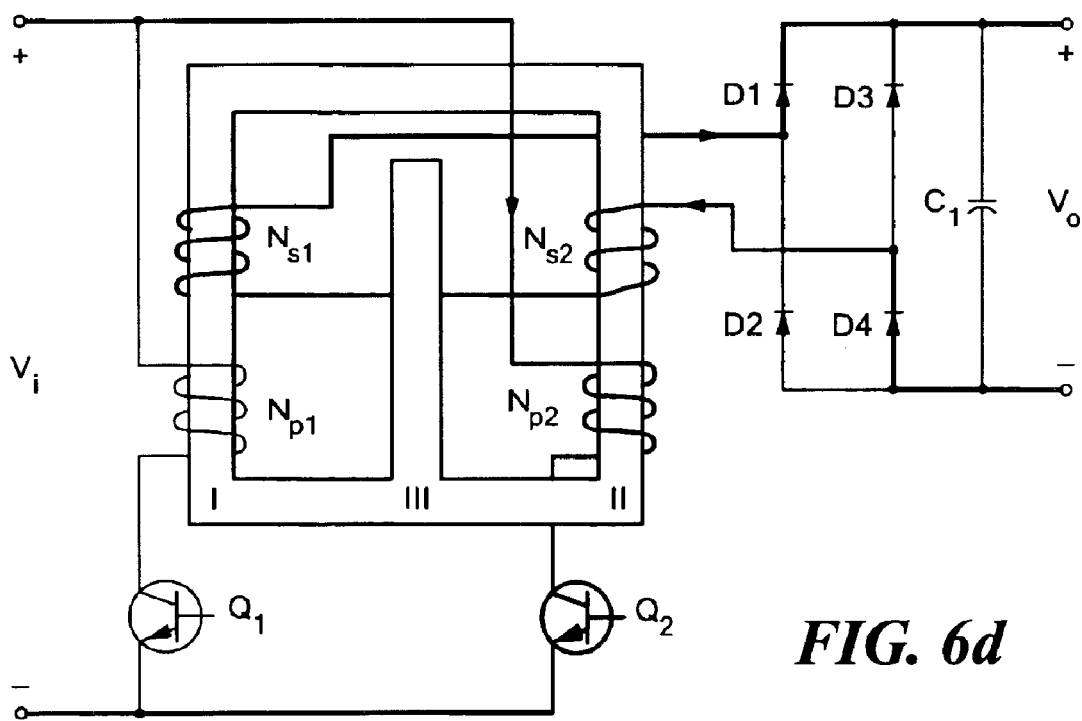

FIG. 5 illustrates the operating waveforms. Time $t_1$–$t_5$ is one switching cycle, including four operating phases. FIGS. 6a–6d show the current paths in the four phases. To simplify the analysis, all the devices are assumed to be ideal. The mmfs on the permeances of the core legs are neglected ($F_{j(j=1,2,3)}=0$), i.e. these permeances are assumed to be infinite compared with the permeance of the gap. Let the driving signals of $Q_1$ and $Q_2$ be as in FIG. 5. The operation principle can be explained as below.

a. Time $t_1$–$t_2$: Both switches $Q_1$ and $Q_2$ are on. The currents in the primary windings $I_{p1}$ and $I_{p2}$ increase as shown in FIG. 5. The voltages on secondary windings $N_{s1}$ and $N_{s2}$ are equal, but the polarities are opposite. Hence, the overall voltage difference between the two terminals A and B in FIG. 6(a) is zero. All the diodes D1–D4 are blocked. The flux level $\Phi_g$ in the gap increases. This is the energy storage stage as in a typical boost circuit.

The flux rates in the two outer legs can be determined directly from the voltages on windings $N_{p1}$ and $N_{p2}$:

$$\dot{\Phi}_1 = \frac{V_i}{N_{p1}}, \quad \dot{\Phi}_2 = \frac{V_i}{N_{p2}} \qquad (1)$$

By Kirchoff's current law (KCL) in FIG. 4, the flux rate in the center leg III is the summation of the flux rates in two outer legs I and II. Let $N_{p1}=N_{p2}=N_p$, then $$\dot{\Phi}_3 = \dot{\Phi}_1 + \dot{\Phi}_2 = \frac{2V_i}{N_p} \qquad (2)$$

Let it be assumed that the flux rates have directions as marked in the models of FIG. 4. FIG. 5 shows both the flux rates and the flux in each leg. Since the voltages on the windings are constant in this stage, the flux rates in the core legs are also constant. Thus, the fluxes increase linearly.

b. Time $t_2$–$t_3$: Switch $Q_2$ turns off at $t_2$ and remains off for this interval. In this stage, $N_{p1}$ delivers input power to the secondary side. $I_{p1}=I_{in}$, $I_{p2}=0$, where $I_{in}$ is the input current. The voltages on secondary windings $N_{s1}$ and $N_{s2}$ forward bias diodes $D_2$ and $D_3$. The currents in $D_2$ and $D_3$ are shown in FIG. 5 as $I_{D2/3}$. The stored energy in the gap is released and the flux level $\Phi_g$ decreases. Applying the same derivation method, the flux rates are obtained:

$$\dot{\Phi}_1 = \frac{V_i}{N_{p1}}, \quad \dot{\Phi}_2 = -\frac{V_o - V_i N_{s1}/N_{p1}}{N_{s2}} \quad (3)$$

The actual direction of flux rate $\dot{\Phi}_2$ is downward. Using KCL in FIG. 4 and letting $N_{s1}=N_{s2}=N_s$, $$\dot{\Phi}_3 = \frac{2V_i}{N_p} - \frac{V_o}{N_s} \quad (4)$$

The flux rates in the core legs are constant in this stage. So flux $\Phi_1$ increases ($\dot{\Phi}_1>0$) and flux $\Phi_2$, $\Phi_3$ decrease ($\dot{\Phi}_2<0$, $\dot{\Phi}_3<0$) linearly.

c. Time $t_3$–$t_4$: Both switches $Q_1$ and $Q_2$ are again on. This operating phase is the same as that in time interval $t_1$–$t_2$.

d. Time $t_4$–$t_5$: Switch $Q_1$ turns off at time $t_4$ and remains off during this interval. In this phase, $N_{p2}$ delivers input power to the secondary side, while $N_{p1}$ is not conducting. Diodes $D_1$ and $D_4$ conduct output current.

The total flux change in the center leg ($\Phi_g$) must be equal to zero within a half cycle. If duty ratio D and period T are defined as in FIG. 4, then interval $t_1$–$t_2$ has time duration (D–0.5)T and interval $t_2$–$t_3$ has time duration (1–D)T. By equations (2) and (4), $$(D-0.5)T \times \frac{2V_i}{N_p} + (1-D)T \times \left(\frac{2V_i}{N_p} - \frac{V_o}{N_s}\right) = 0.$$

Thus, the input-to-output voltage ratio is obtained:

$$\frac{V_o}{V_i} = \frac{N_s}{N_p} \frac{1}{1-D} \quad (5)$$

The currents in the windings are now derived. Referring to the models in FIG. 4, in time duration $t_1$–$t_2$, $$F_{p1}=F_{p2}=F_g (\text{Since } F_{j(j=1,2,3,)}=0) \quad (6)$$

From the definition of mmf, $$F_{p1}=N_{p1}I_{p1}, \; F_{p2}=N_{p2}I_{p2} \quad (7)$$

The input current is the summation of the currents in two primary windings, $$I_{in}=I_{p1}+I_{p2} \quad (8)$$

From (6) to (8) and $N_{p1}=N_{p2}=N_p$, $$I_{in} = \frac{2F_g}{N_p} \quad (9)$$

In time interval $t_2$–$t_3$, the input current can also be expressed by equation (9). Actually, equation (9) is valid through the entire switching cycle. So the input current is always proportional to the mmf on the gap.

Figure 7B:
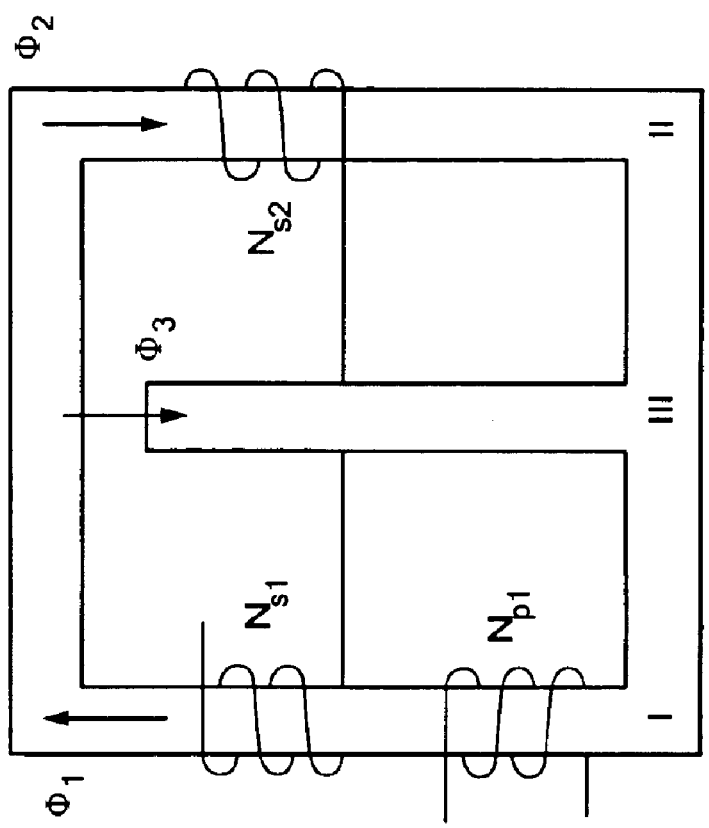
FIGS. 7a and 7b are schematic diagrams illustrating differences in flux conduction between prior converters and the converter of FIG. 3.
Figure 7A:
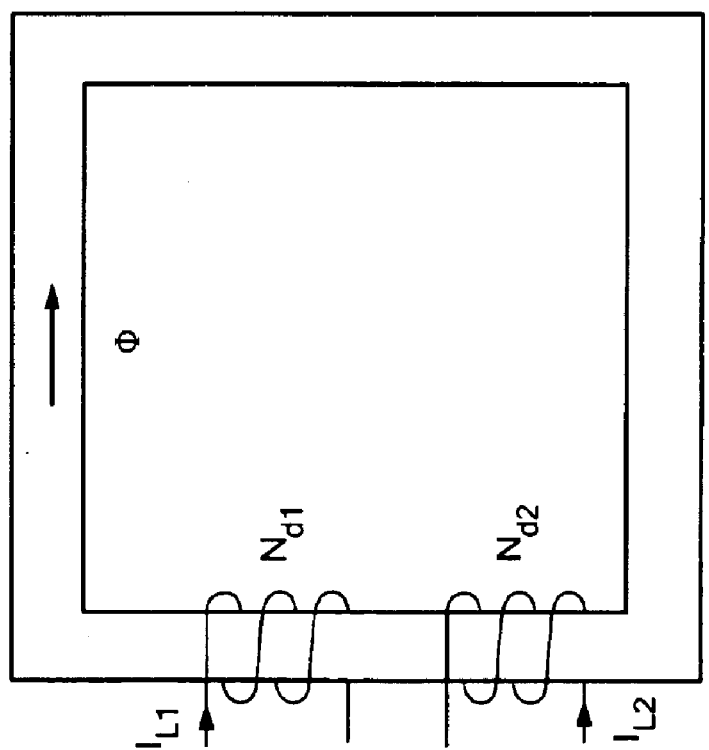

In the presently disclosed circuit, the input current is limited when the overlapping of two driving signals is small. This mechanism can be explained by comparing the discrete core counterpart of FIG. 2. FIG. 7(a) shows the flux path of the auxiliary transformer $T_2$ of the circuit of FIG. 2. FIG. 7(b) shows the flux paths of the integrated magnetic transformer T of the circuit of FIG. 3 when only switch $Q_1$ is on.

In FIG. 7(a), winding turns $N_{d1}=N_{d2}$. Suppose the currents in the two windings are different, i.e. $I_{L1}=I_{L2}+\Delta I$. The difference current, $\Delta I$, becomes the magnetizing current of transformer $T_2$ to generate the flux $\Phi$. Subsequently $\Delta I$ is limited by the inductance of $T_2$. In FIG. 7(b), since the reluctance of Leg III is much larger than the reluctance of Leg II due to the gap, most of the flux $\Phi_2$ goes through Leg II. Therefore, if the output voltage is high enough, the transformer exhibits large inductance to the input. The input current is then limited. This is one of the key improvements of the proposed topology over the conventional two-inductor boost converter in FIG. 1.

It is important to note that the output voltage must be high enough, or, regulated. If the output voltage drops below the reflected input voltage, the transformer will directly deliver power to the load without inductor filtering. This problem is further discussed below.

Design Considerations

The number of primary and secondary winding turns $N_p$ and $N_s$ should be selected to achieve tolerable input current ripple and peak flux densities. The following formulas can be used to verify that the design values are within the tolerance.

The peak-to-peak input current ripple can be derived as $$I_{in\_d} = \frac{2V_o(2D-1)(1-D)}{N_p N_s f_s P_g} \quad (10)$$

The permeance of the gap $P_g$ is defined by $P_g=\mu_0 A/l_g$ and is typically specified as the inductance factor (i.e. "$A_L$" value) in datasheets. $f_s$ is the switching frequency; $\mu_0$ is the permeability of air; A is the cross-sectional area of the gap; $l_g$ is the gap length.

The average flux density in the center leg is $$B_{c\_av} = \frac{N_p I_{in\_av} P_g}{2A_c},$$

where $I_{in\_av}$ is the average input current and $A_c$ is the cross-sectional area of the center leg. The average flux density in the outer legs is (identical for two outer legs) $B_{o\_av}=B_{c\_av}/2$. The flux swing in the center leg is $$B_{c\_d} = \frac{2V_o(1-D)(D-0.5)}{N_s f_s A_c}.$$

The flux swing in the outer legs is $$B_{o\_d} = \frac{V_o D(1-D)}{N_s f_s A_o},$$

where $A_o$ is the cross-sectional area of one outer leg.

Therefore, the peak flux density in the center leg is $$B_{c\_p}=B_{c\_av}+B_{c\_d}/2 \quad (11)$$

The peak flux density in the outer legs is $$B_{o\_p}=B_{o\_av}+B_{o\_d}/2 \quad (12)$$

Both $B_{c\_p}$ and $B_{o\_p}$ must be kept below the saturation value.

Comparison to Discrete Core Boost Topology

Below is presented a comparison between the integrated magnetic assembly of FIG. 3 with the magnetic assemblies in the boost circuit of FIG. 2, specifically focusing on the magnetic cores and their windings. The cross-sectional areas and the winding turns for each topology are first derived in terms of peak flux density and input current. Then, the size reduction of magnetic components due to integration is presented. It is assumed that the electrical specifications are the same for both boost topologies, and that the cross-sectional areas are determined based on the same peak flux densities.

The following definitions are utilized referring to FIG. 2: $B_p$—peak flux density; $A_{dT1}$—cross-sectional area of integrated magnetic transformer $T_1$; $A_{dT2}$—cross-sectional area of the auxiliary transformer T2; $A_{dL}$—cross-sectional area of each inductor; $P_{dL}$—permeance of the gap in each inductor; $N_{au}$—winding turns of $T_2$; $N_{dp}$—primary winding turn of $T_1$; $N_{ds}$—secondary winding turn of $T_1$.

A. $A_{dL}$ vs. $A_c$

It can be derived from FIGS. 2 and 3 that $$\frac{I_{in\_av}}{2} + \frac{I_{in\_d}}{4} = \frac{A_{dL}B_p}{N_L P_{dL}} = \frac{A_c B_p}{N_p P_g} \quad (13)$$

The assumptions suggest that the input currents of two converters have identical ripples and average values. So, we can also obtain $$2N_L^2 P_{dL} = N_P^2 P_g \quad (14)$$

From (13) and (14), we have $2N_L A_{dL} = N_p A_c$. If we let $N_L = N_p$, then $2A_{dL} = A_c$. This result implies that if the inductor windings are used as the primary windings of the integrated magnetic transformer, the cross-sectional area of the center leg is equal to the combination of two inductors $L_1$ and $L_2$ side by side, as depicted in the dashed boxes of FIGS. 8a and 8b.

B. $A_{dT1} + A_{dT2}$ vs. $A_o$

The peak fluxes in transformer $T_1$ and $T_2$ can be derived:

$$A_{dT1}B_p = \frac{V_o(1-D)}{2N_{ds}f_s} \quad (15)$$

$$A_{dT2}B_p = \frac{V_o(1-D)}{2N_{ds}f_s} \cdot \frac{N_{dp}}{2N_{au}} \quad (16)$$

The peak flux in the outer leg of the integrated magnetic core is:

$$A_o B_p = \frac{1}{4} I_{in\_av} N_p P_g + \frac{V_o(1-D)D}{2N_s f_s} \quad (17)$$

Representing (15), (16), (17) in terms of input current ripple leads to $$(A_{dT1} + A_{dT2})B_p = \frac{N_L^2 P_{dL} I_{in\_d}}{2(2D-1)N_{dp}}\left(1 + \frac{N_{dp}}{2N_{au}}\right) \quad (18)$$

$$A_o B_p = \frac{1}{4} N_p P_g \cdot \left(I_{in\_av} + \frac{I_{in\_d}}{2D-1}D\right) \quad (19)$$

To acquire an instructive comparison, it is reasonable to consider an example that satisfies (a) $I_{in\_d} = 20\% I_{in\_av}$ and (b) $N_{au} = N_{dp}$. Using (14), we can obtain the ratio $$\frac{A_o}{A_{dT1} + A_{dT2}} = \frac{2(11D-5)N_{dp}}{3N_p} \quad (20)$$

Figure 9:
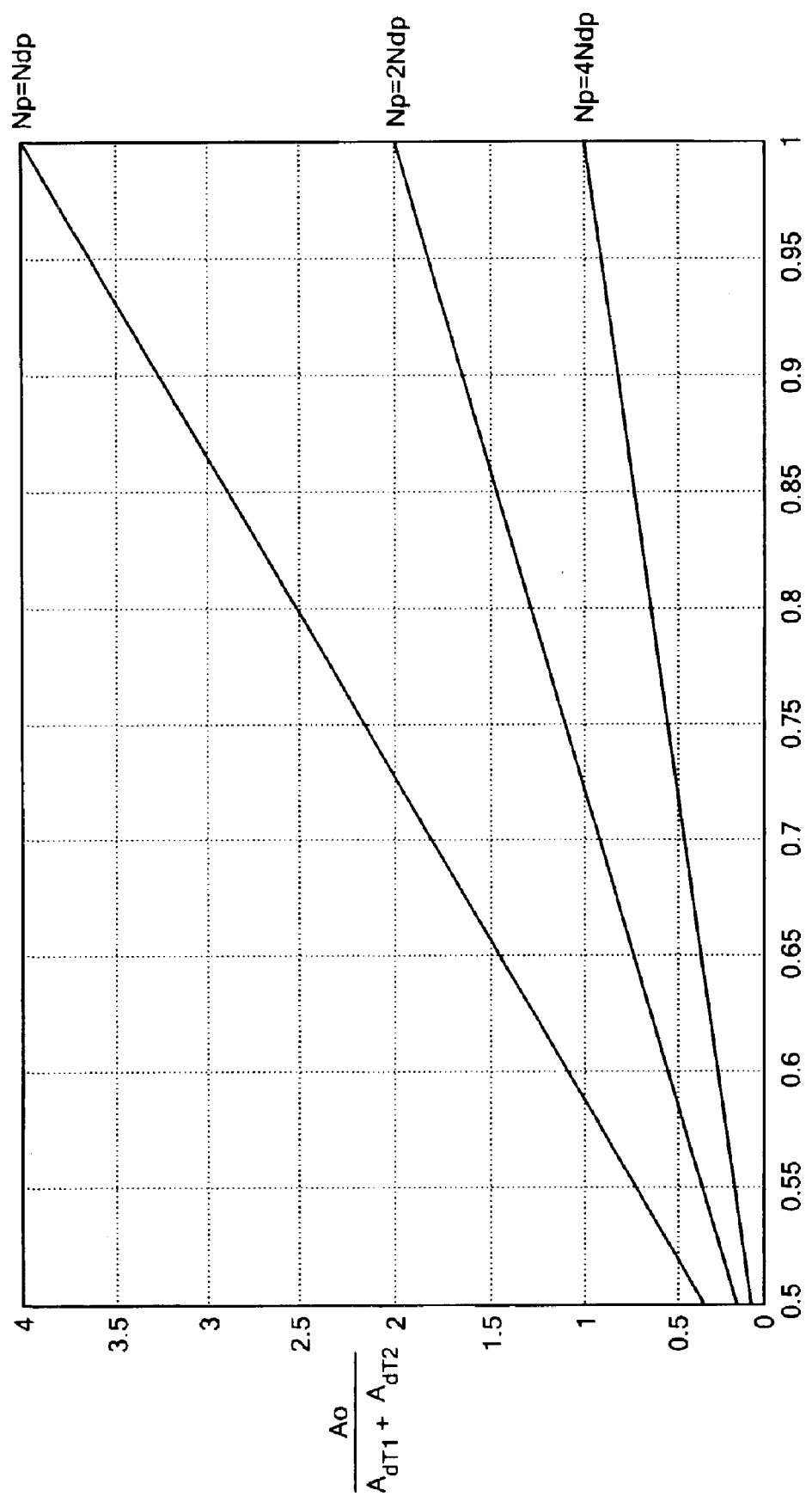
FIG. 9 is a plot of a size comparison between the integrated magnetics of the circuit of FIG. 3 with the discrete magnetics of the circuit of FIG. 2 as a function of duty cycle D and primary turns Np.

Ratio (20) is drawn in FIG. 9 for the duty ratio D varying between 0.5 and 1.

According to FIG. 9, depending on: 1) the winding turns of the isolation transformer, the auxiliary transformer and the inductors, 2) the current ripple requirement, and 3) the steady state duty ratio, $A_o$ can be larger or smaller than $A_{dT1} + A_{dT2}$. For example, if $N_p = 2N_{dp}$, when the designed duty ratio is less than 0.72, then $A_o < A_{dT1} + A_{dT2}$; otherwise, if the designed duty ratio is greater than 0.72, $A_o > A_{dT1} + A_{dT2}$. If $N_p = 4N_{dp}$, then it is always the case that $A_o < A_{dT1} + A_{dT2}$.

The following three additional considerations apply:

1. If the input current ripple requirement is strict, i.e. $I_{in\_d} \ll I_{in\_av}$, then by comparing (13) with (18) and (19), $2A_{dL}$ in the discrete core boost converter is expected to be larger than $A_{dT1} + A_{dT2}$. This is also true between $A_c$ and $A_o$. Since in the discrete core boost converter, extra core legs (as Leg 1 and Leg 1' in the inductors of FIG. 8) are needed to close the flux paths of the two inductors, the size reduction of the proposed integrated magnetic assembly can be justified.

2. The proposed magnetic assembly uses two primary windings. The number of winding turns is typically equal to that of the inductors. Therefore, the primary winding of $T_1$ and two windings of $T_2$ in FIG. 2 are saved. The fewer primary side windings and soldering connections reduce copper loss.

3. The proposed integrated magnetic boost converter requires two sets of secondary windings. However, since the secondary current is typically low, the wires can be thin and take up small window space of the core.

Practical Considerations

Figure 10:
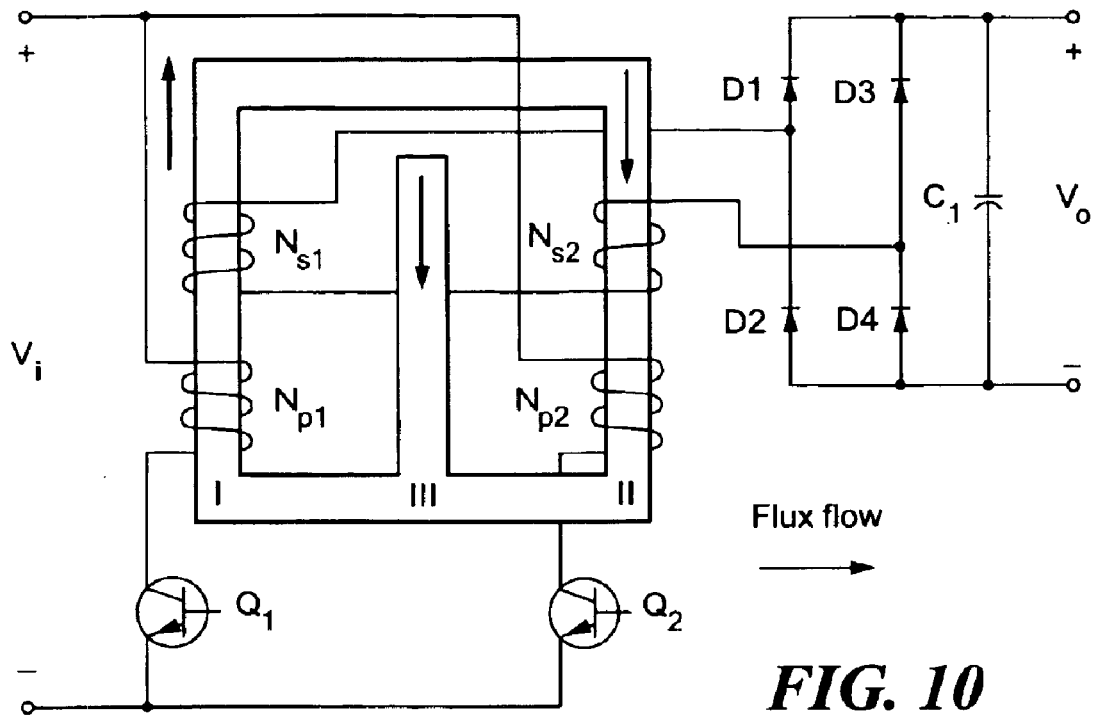
FIG. 10 is a schematic diagram illustrating the direct transfer of power from input to output in the converter of FIG. 3 during start-up operation.

There are practical issues of start-up and protection in the disclosed two-inductor boost converter. At start-up, the output voltage is zero. If transistors $Q_1$ and $Q_2$ begin to operate, the transformer-style coupling between the primary and secondary windings will deliver power directly from the input to the load without inductor filtering. This is illustrated in FIG. 10. Suppose $Q_2$ is off and $Q_1$ turns on. Because the center leg III exhibits large reluctance, most flux flows through Leg II. The voltages on $N_{s1}$ and $N_{s2}$ have the polarities as indicated in FIG. 10. The large initial current may damage the diodes D2, D3 in the current path. Therefore, the output capacitor must be pre-charged in advance to block these diodes.

With respect to protection, there must be some means to protect the circuit in the event that an error in the duty ratio (i.e., D<0.5) occurs. In the absence of a protection mechanism, the converter will be damaged because there is no path to release the energy in the gap when both switches turn off.

Figure 11:
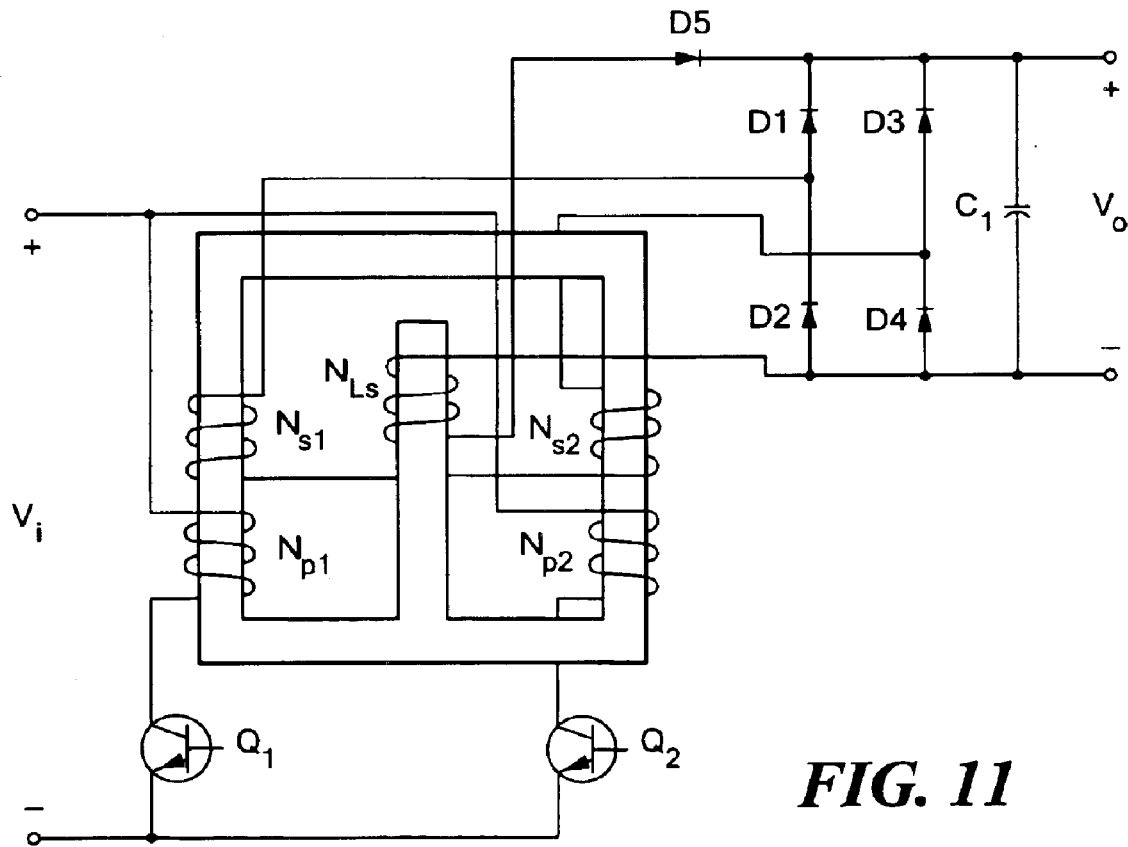
FIG. 11 is a schematic diagram of a two-inductor, integrated magnetics boost converter employing an additional inductor winding for startup purposes in accordance with the present invention.
Figure 12:
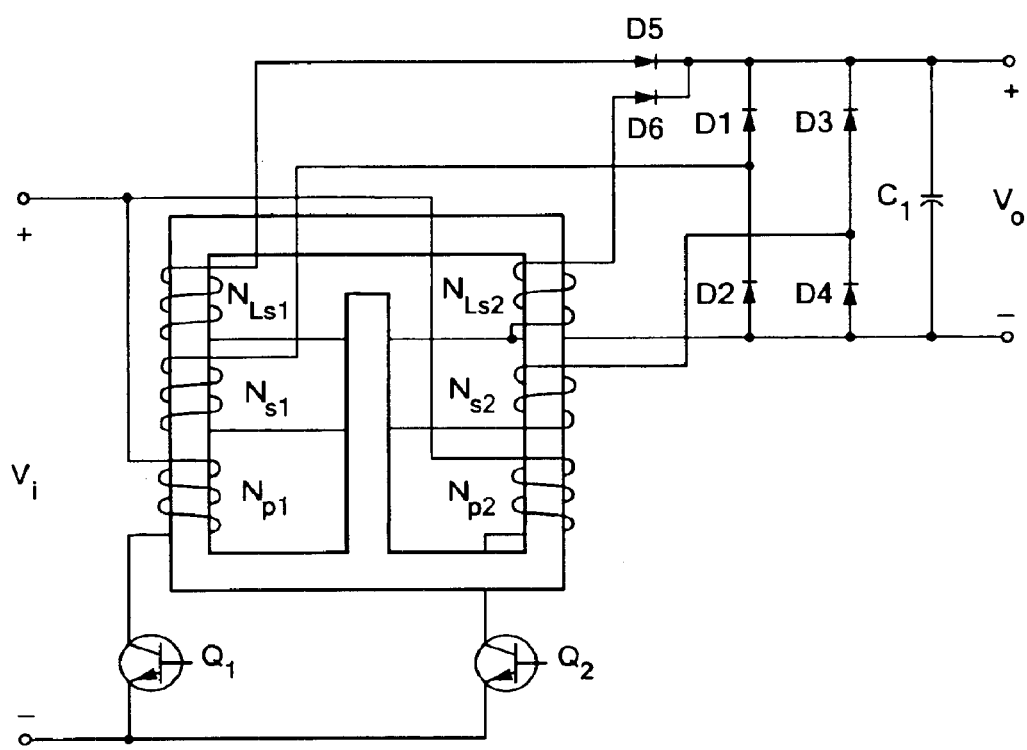
FIG. 12 is a schematic diagram of a two-inductor, integrated magnetics boost converter employing two additional inductor windings for startup purposes in accordance with the present invention.

FIG. 11 shows a solution that can be used for both start-up and protection purposes. One additional winding $N_{Ls}$ is added around the center leg. FIG. 12 shows an alternative solution in which two additional windings $N_{Ls1}$ and $N_{Ls2}$ are added around the two outer legs.

Figure 13:
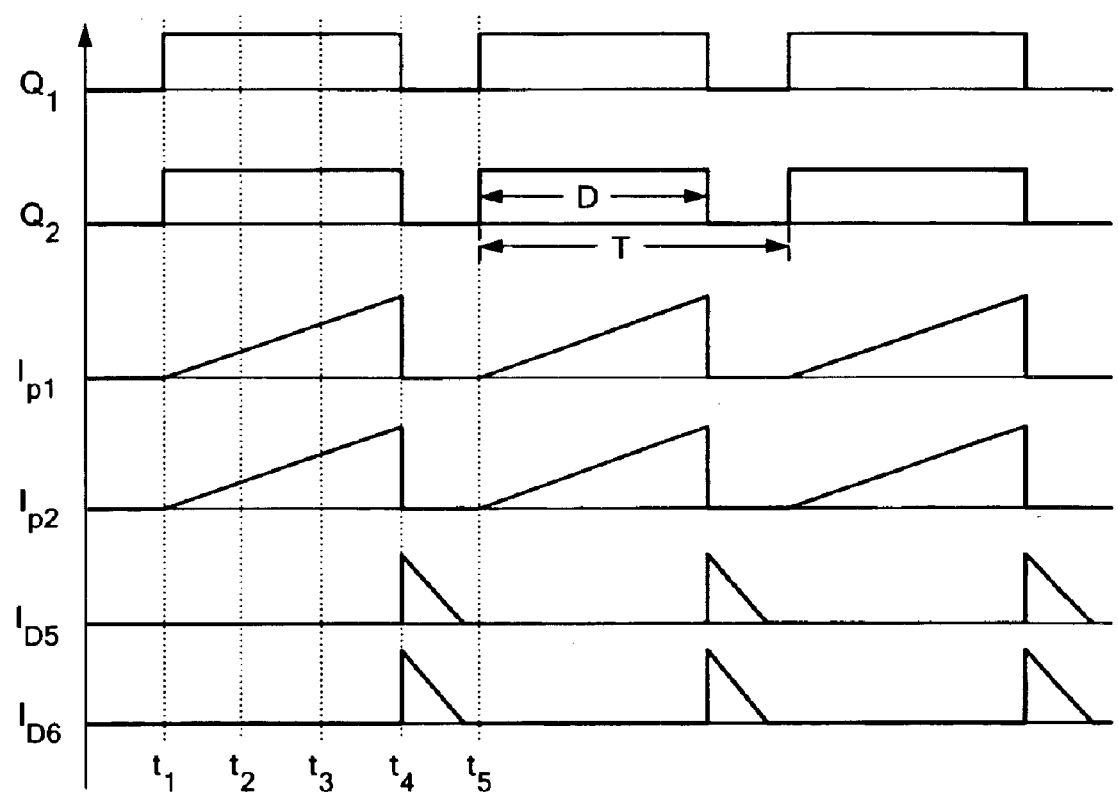
FIG. 13 is a diagram of certain start-up operating waveforms in the converter of FIG. 12.
Figure 14A:
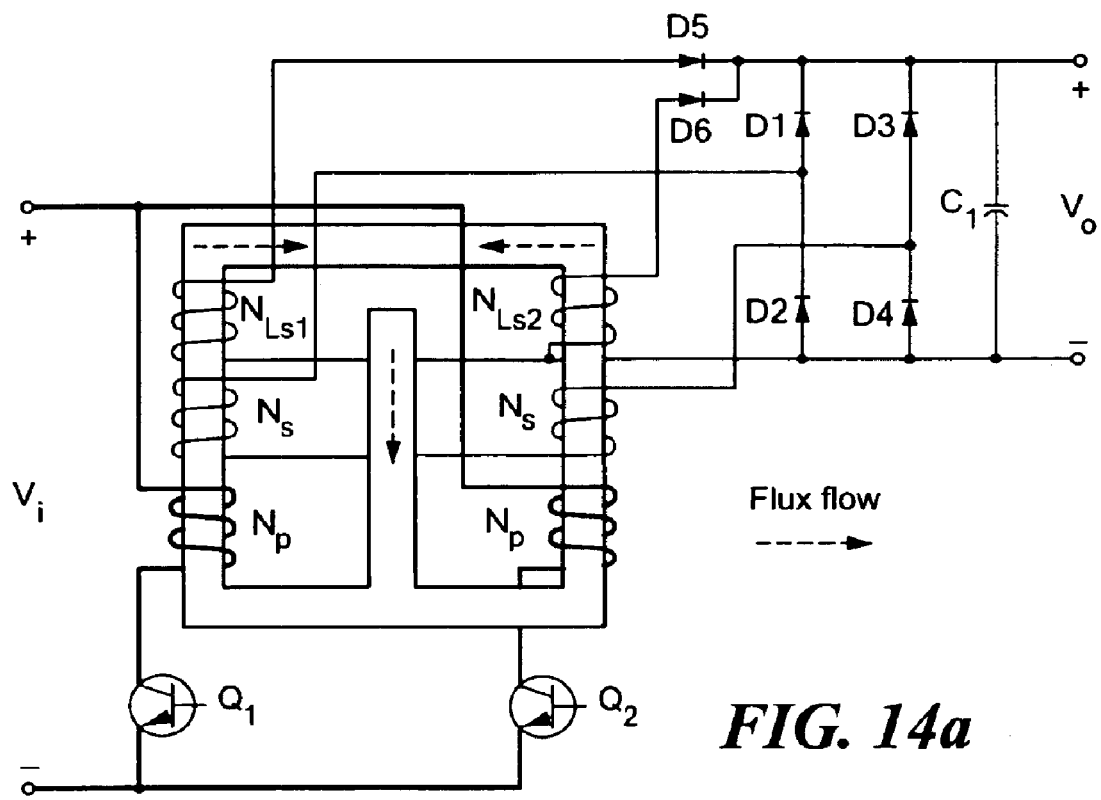
FIGS. 14a–14b are schematic diagrams illustrating different operating phases in the start-up of the converter of FIG. 12.
Figure 14B:
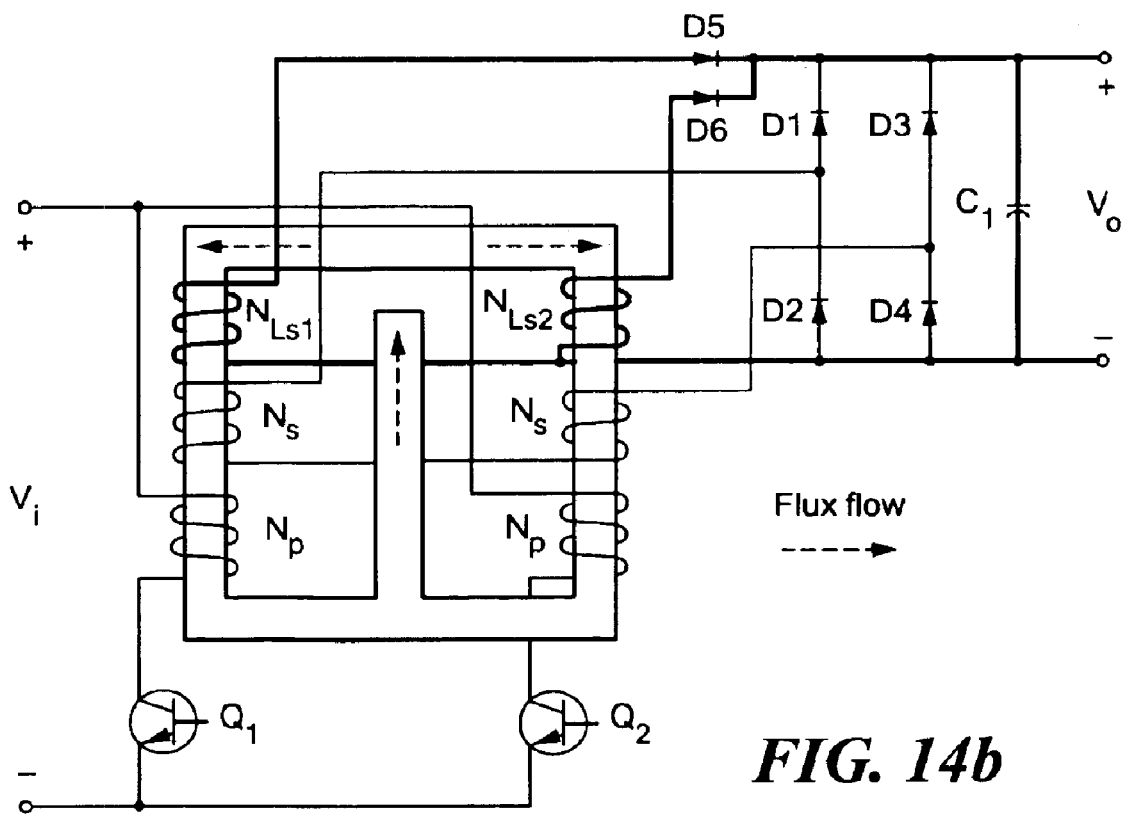

The circuit in FIG. 12 is used to illustrate the operating principle. The start-up operating waveforms are shown in FIG. 13. The driving signals of $Q_1$ and $Q_2$ are identical. The circuit is operating in flyback mode. As in FIG. 14, when $Q_1$ and $Q_2$ turn on (stage 1), the flux is stored in the gap and none of the secondary side windings conduct. When $Q_1$ and $Q_2$ turn off (stage 2), the additional windings deliver the stored energy in the gap to the output. In both stages, $D_1$–$D_4$ are blocked because the overall voltage between two terminals of the secondary windings is zero. Indeed, the primary windings $N_{p1}$, $N_{p2}$ and the additional windings $N_{Ls1}$ and $N_{Ls2}$ form an integrated magnetic push-pull circuit. However, this circuit cannot work in buck mode (i.e. Q1 and Q2 cannot be closed alternately) because it will also cause the direct power transfer from the primary windings to the secondary windings without filtering inductance.

In normal boost mode operation, the lowest output voltage appears when the duty ratio D=0.5. By equation (5), the minimum charged voltage $V_{o\_pre}$ should satisfy $$V_{o\_pre} \geq 2\frac{N_s}{N_p}V_i.$$

It will be noted the additional windings $N_{Ls1}$ and $N_{Ls2}$ provide current paths for releasing energy from the gap during normal operation as well. Therefore, the additional windings also serve as protection against occasional duty ratio error.

To avoid interfering with the normal operation, the maximum duty ratio is limited by the additional windings. Referring to the circuit in FIG. 11, in operation phase $t_1$–$t_2$, the direction of flux rate in the center leg is downward, as in FIG. 4. The reflected voltage on the inductor winding blocks $D_5$. However, in operation phase $t_2$–$t_3$, the flux flow in the center leg attempts to forward bias $D_5$. To avoid this, the reflected voltage on $N_{Ls}$ must be lower than the output voltage. Therefore, $$\left(\frac{V_o}{N_s} - \frac{2V_i}{N_p}\right) \times N_{Ls} < V_o.$$

By equation (5), the constraint on the inductor winding turns is $$N_{Ls} < \frac{N_s}{2D_{max} - 1}.$$

For the same reason, the windings $N_{Ls1}$ and $N_{Ls2}$ in FIG. 12 should satisfy $$N_{Ls1} < \frac{N_s}{D_{max}}, \quad N_{Ls2} < \frac{N_s}{D_{max}}.$$

An alternative protection scheme is to build an additional clamping circuit. However, since the additional windings can be used for protection, the extra circuit is only necessary if it is desired to absorb the energy in the leakage inductance.

Topology Variations

Figure 15:
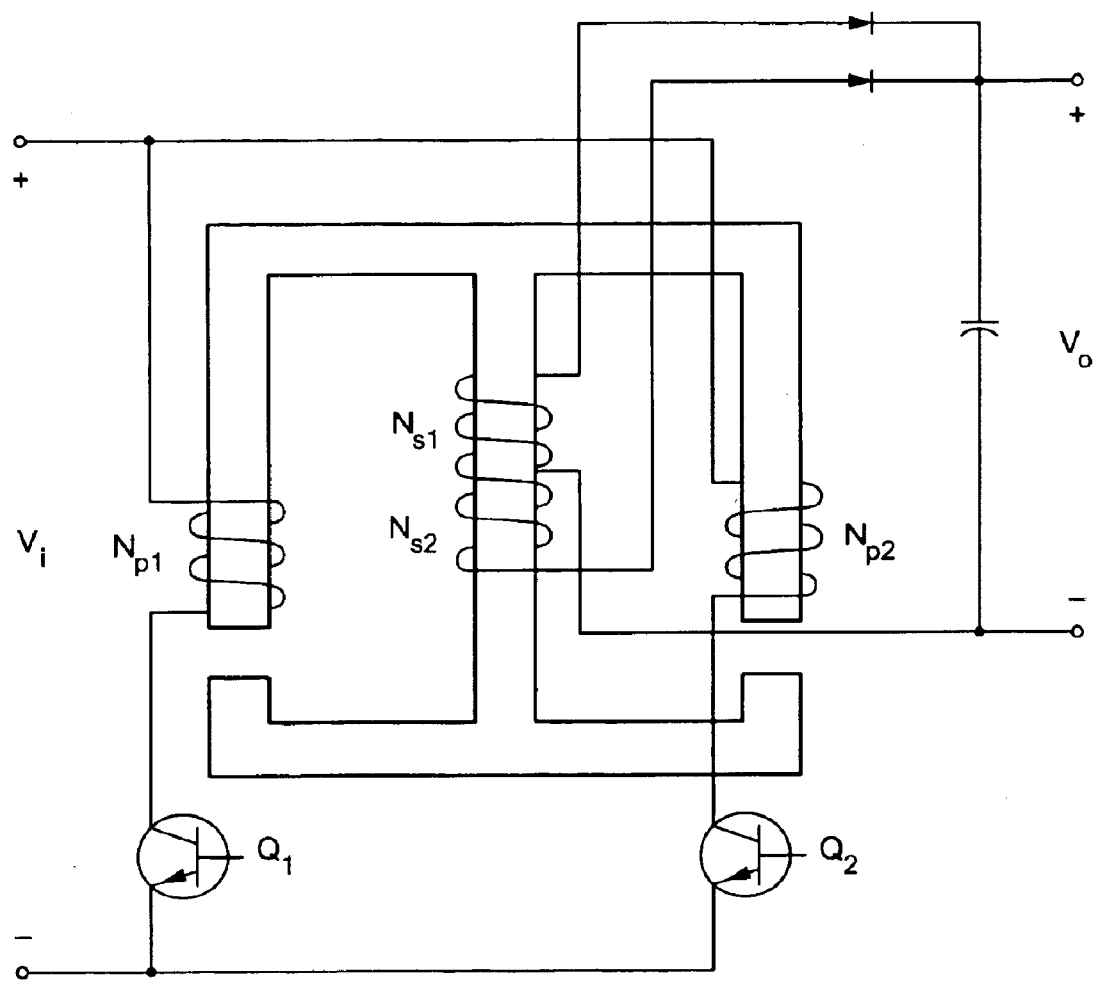
FIG. 15 is a schematic diagram of a two-inductor, integrated magnetics boost converter having gaps in the outer core legs in accordance with the present invention.
Figure 16:
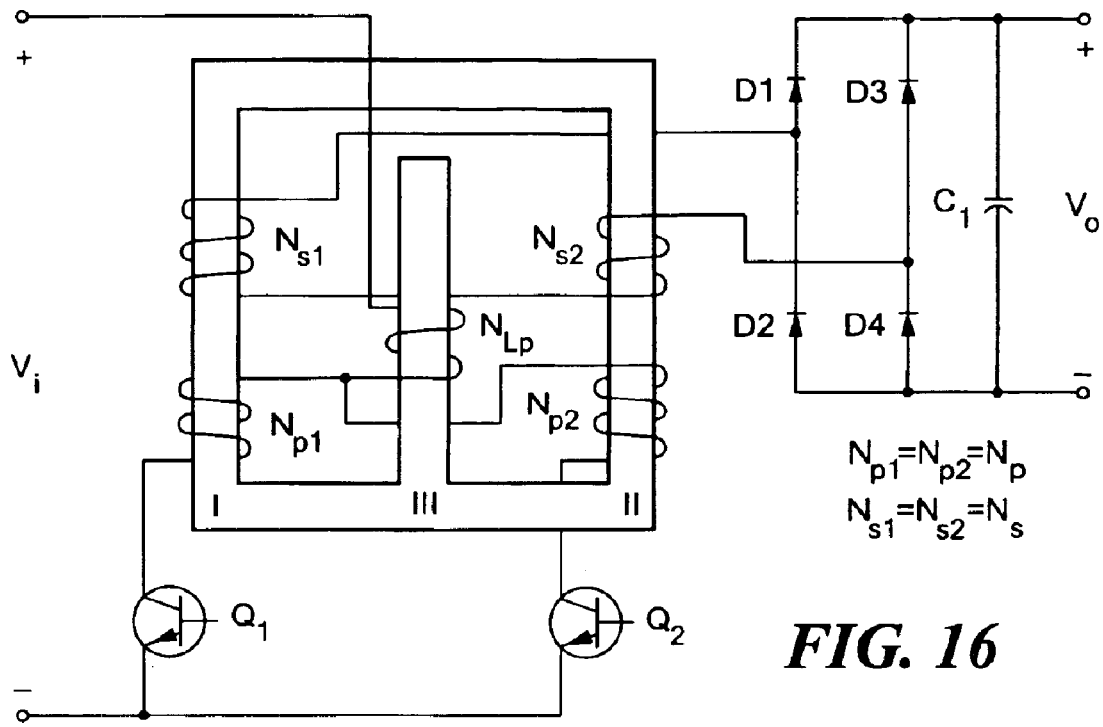
FIG. 16 is a schematic diagram of a two-inductor, integrated magnetics boost converter employing an additional inductor winding on the primary side in accordance with the present invention.
Figure 17:
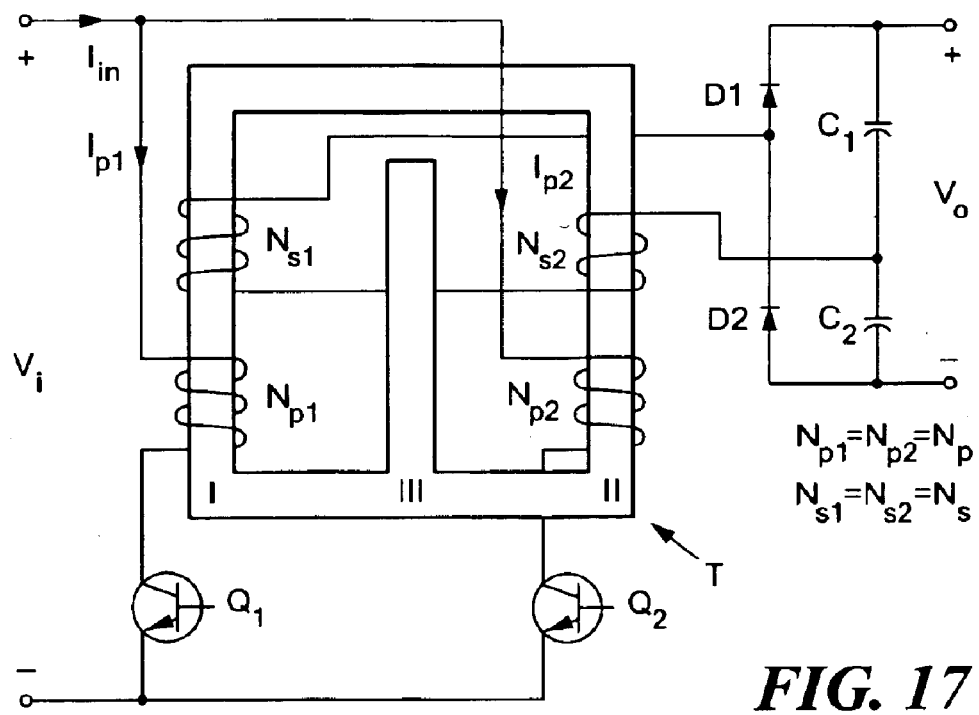
FIG. 17 is a schematic diagram of a two-inductor, integrated magnetics boost converter employing a voltage doubler output stage in accordance with the present invention.

Some topology variations are shown in FIGS. 15–17. FIG. 15 shows a two-inductor boost converter using a magnetic core with two gaps, one in each of the outer legs. The secondary winding is center tapped. As shown, the rectification stage can use full-wave instead of full-bridge structure, which saves two output rectifiers. However, the two current paths on the primary side are not coupled, and therefore this circuit does not have the advantage of wide power regulation range.

FIG. 16 shows a second alternative in which an additional inductor winding $N_{Lp}$ is added around the center leg. The inductor winding is inserted between the input and the two primary windings. $N_{Lp}$ does not change the input-to-output voltage ratio but influences the primary current ripple and the flux distribution in the three core legs. This is desirable in some applications in which the optimization of the transformer is crucial.

FIG. 17 shows the use of a so-called "voltage doubler" type of output circuit, which uses two diodes D1, D2 and two capacitors C1 and C2 instead of the four-diode, single-capacitor output circuit of FIG. 3. This output structure can be used in conjunction with the basic core structure of FIG. 3, as shown in FIG. 17, and can also be used with core structures such as those of FIGS. 11, 12 and 16.

Simulation and Experimentation Results

Figure 18:
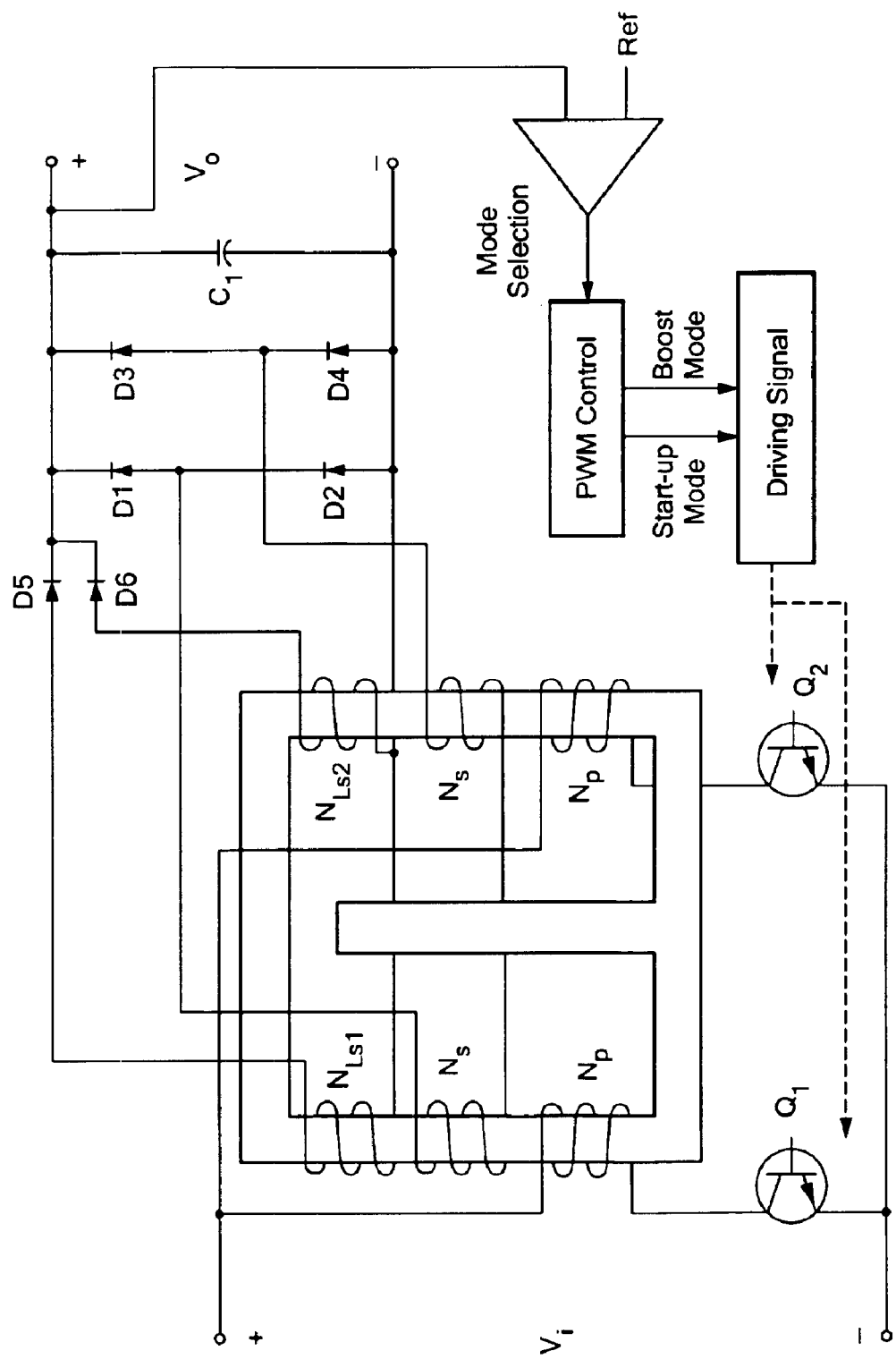
FIG. 18 is a schematic diagram of an evaluation circuit including the converter of FIG. 12 along with control circuitry.

FIG. 18 shows a DC—DC converter built for evaluation purposes using the disclosed topology. The evaluation circuit is a 40 watt converter, although the disclosed topology is generally best suited for higher power applications. The particular design specifications of the evaluation circuit are as follows: input voltage 2.5V; output voltage 72V; maximum input current ripple 5A. The control scheme is determined by the output voltage. If the output voltage is below the designed pre-charge voltage, the PWM control unit works in start-up mode. If the output voltage is large enough, the PWM control unit switches to boost mode.

The circuit operates at a switching frequency of 170 KHz. 3-paralleled Si4466 are used as the primary switches. The turns ratio of the transformer is selected as 12. According to the power level, one E18/4/3F3 magnetic core was used with $A_L$=250 nH. From design criteria (10)–(12), $N_p$=2 satisfies the above requirements and also provides sufficient duty ratio range for regulation. The secondary winding $N_s$ is then 24 turns. The flux densities in the core are: Peak flux density in the center leg is 106 mT; peak flux density in the outer legs is 199 mT.

Figure 19A:
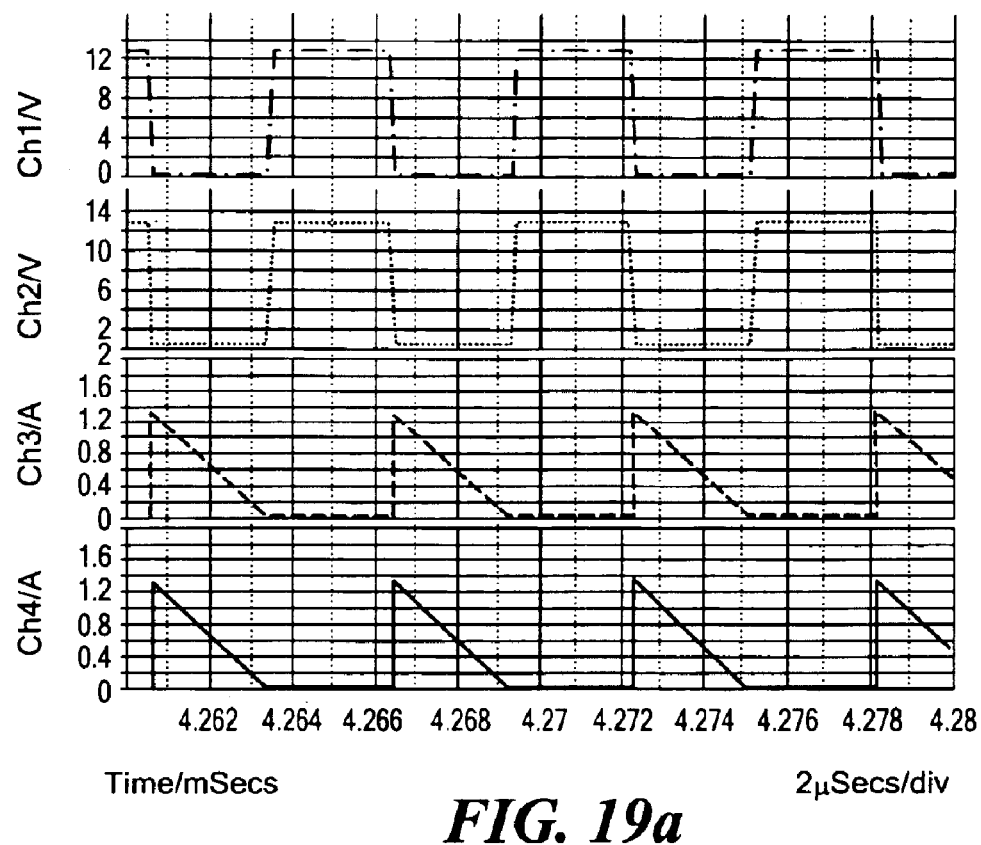
FIGS. 19a and 19b are diagrams depicting certain operating waveforms as determined from a simulation of the converter of FIG. 18.

FIG. 19 show the results of simulations of the circuit of FIG. 18. FIG. 19(a) shows the start-up waveforms as follows:
Ch. 1—Q1 driving signal
Ch. 2—Q2 driving signal
Ch. 3—Current in diode D5
Ch. 4—Current in diode D6

The current waveforms of $D_5$ and D6 show that the circuit is operating in flyback mode.

Figure 19B:
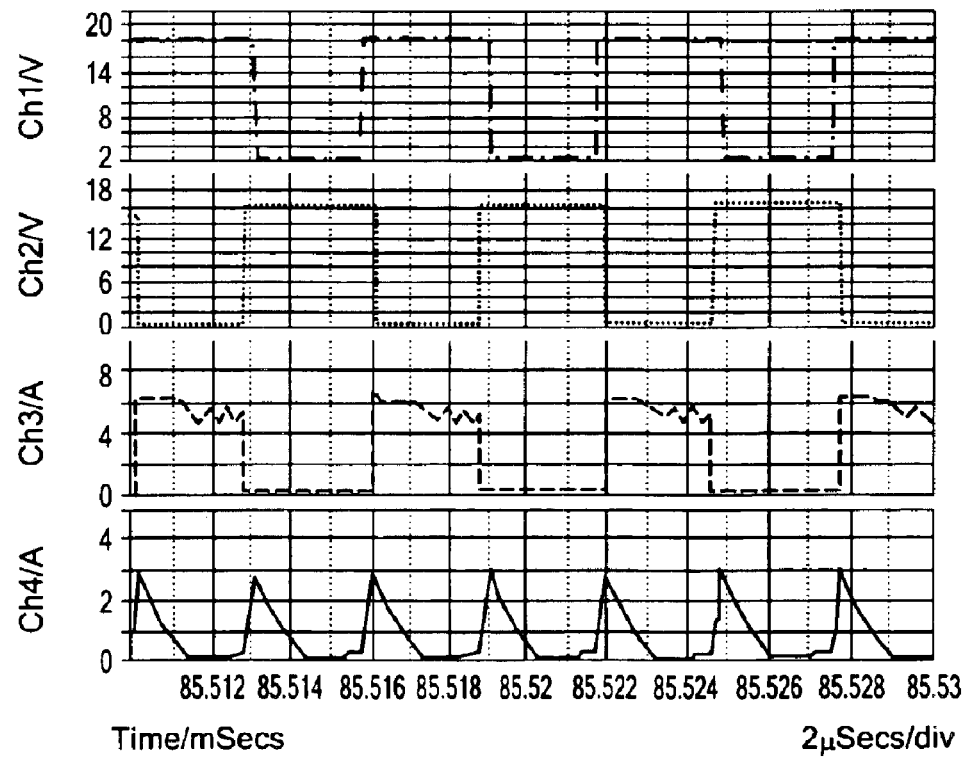

FIG. 19(b) shows the boost-mode operating waveforms as follows:
Ch. 1—Q1 driving signal
Ch. 2—Q2 driving signal
Ch. 3—Q2 drain-source voltage
Ch. 4—Input current The simulation results are consistent with the above analysis of the operating principle. In the boost operating mode, the input current only increases when both switches $Q_1$ and $Q_2$ are closed. Thus, when the load is light, for example at 2 watts as in FIG. 19(b), the input current becomes discontinuous and the input power is limited.

Figure 20A:
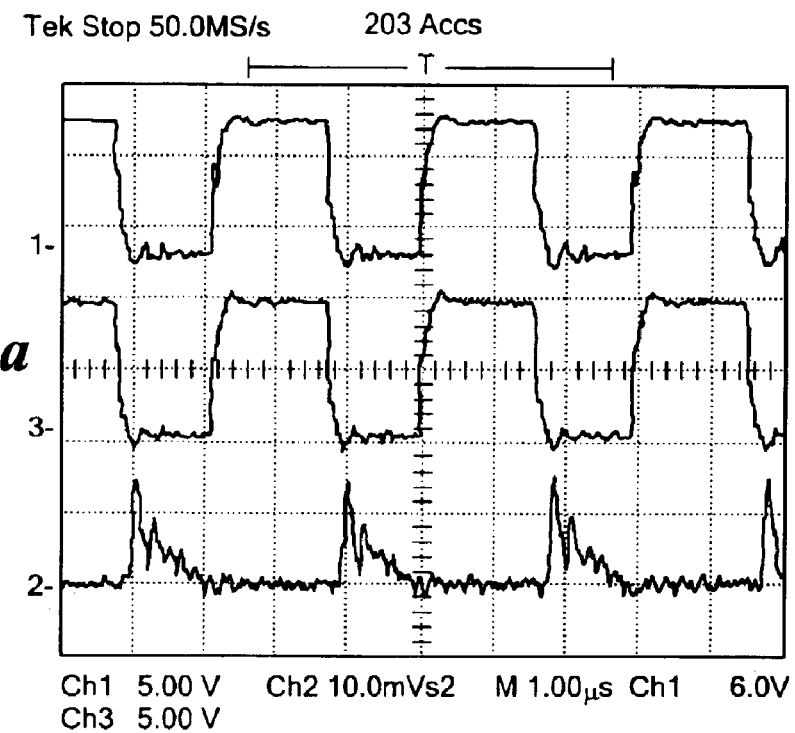
FIGS. 20a and 20b are diagrams depicting certain operating waveforms as determined from operation of a physical implementation of the converter of FIG. 18.
Figure 20B:
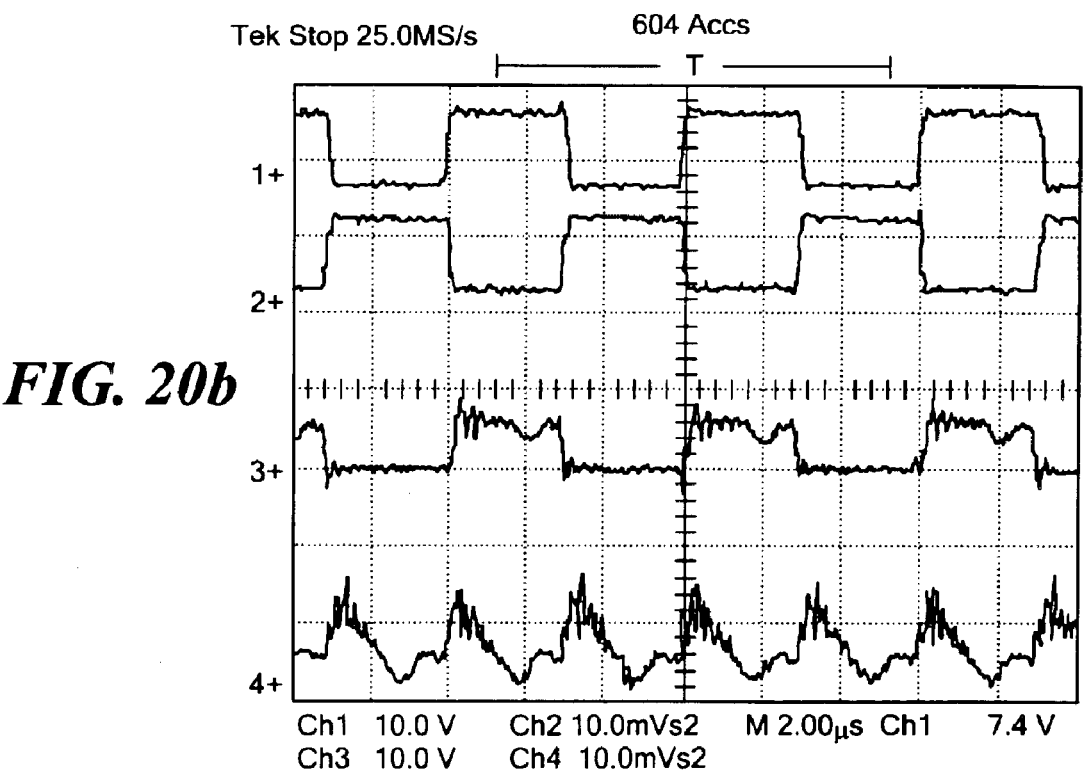

FIG. 20 shows operating waveforms from the actual evaluation circuit. FIG. 20(a) shows the start-up waveform, where Ch. 2 is the current in diode $D_5$. FIG. 20(b) shows the input current waveform when the output power is 2 watts. The input current goes to zero before the driving signal changes, indicating that the circuit works correctly even when the output current is small. This result verifies the analysis and simulation that the integrated magnetic boost converter removes the limitation of power regulation range in the original circuit of FIG. 1.

It will be apparent to those skilled in the art that modifications to and variations of the disclosed methods and apparatus are possible without departing from the inventive concepts disclosed herein, and therefore the invention should not be viewed as limited except to the full scope and spirit of the appended claims.

What is claimed is:

1. A boost DC—DC converter, comprising:
   an integrated magnetic core having (i) a three-legged flux-conducting element, at least one of the legs being an energy-storage leg, (ii) two primary windings each disposed on a respective leg of the flux-conducting element, the primary windings being coupled in parallel to a first input terminal of the converter, and (iii) two series-connected secondary windings disposed on the flux-conducting element;
   secondary-side rectification and filtering circuitry connected across the secondary windings;
   a pair of primary-side switches each coupled in series between a second input terminal of the converter and a respective one of the primary windings; and
   control circuitry operative to generate control signals for the primary-side switches so as to obtain a desired boost-mode output voltage of the converter.

2. A boost DC—DC converter according to claim 1, wherein the energy-storage leg is a middle leg, and each secondary winding is disposed on a respective outer leg of the flux-conducting element.

3. A boost DC—DC converter according to claim 2, wherein the middle leg has an energy-storing gap.

4. A boost DC—DC converter according to claim 2, wherein the middle leg has an energy-storing section of high-permeance material.

5. A boost DC—DC converter according to claim 2, further comprising an inductor winding on the center leg, the inductor winding being connected in series between the first input terminal of the converter and the parallel primary windings.

6. A boost DC—DC converter according to claim 1, wherein two outer legs of the flux-conducting element are energy-storage legs, and wherein the secondary windings are disposed on a middle leg of the flux-conducting element.

7. A boost DC—DC converter according to claim 6, wherein each of the outer legs has an energy-storing gap.

8. A boost DC—DC converter according to claim 6, wherein one output terminal of the converter is coupled to a center tap of the series-connected secondary windings.

9. A boost DC—DC converter according to claim 1, wherein the integrated magnetic core further includes an additional secondary-side winding coupled to the rectification and filtering circuitry, the additional secondary-side winding and the control circuitry being operative to provide for operation of the converter when the output voltage of the converter is less than a predetermined minimum output voltage.

10. A boost DC—DC converter according to claim 9, wherein the additional secondary-side winding is a single winding disposed on the middle leg of the flux-conducting element of the integrated magnetic core.

11. A boost DC—DC converter according to claim 9, wherein the additional secondary-side winding is one of two windings disposed on respective outer legs of the flux-conducting element of the integrated magnetic core.

12. A boost DC—DC converter according to claim 11, wherein the additional secondary-side winding and the control circuitry are operative to provide for flyback operation of the converter when the output voltage of the converter is less than the predetermined minimum output voltage.

13. A boost DC—DC converter according to claim 1, wherein the rectification and filtering circuitry has a full-wave rectification topology.

14. A boost DC—DC converter according to claim 1, wherein the rectification and filtering circuitry has a full-bridge rectification topology.

15. A boost DC—DC converter according to claim 1, wherein the rectification and filtering circuitry has a voltage doubler rectification topology.

* * * * *